(12) United States Patent
Farneth et al.

(10) Patent No.: US 8,159,385 B2
(45) Date of Patent: Apr. 17, 2012

(54) CONDUCTIVE LINE COMMUNICATION APPARATUS AND CONDUCTIVE LINE RADAR SYSTEM AND METHOD

(75) Inventors: Mike Farneth, East Syracuse, NY (US); Stephen E. McMahon, Homer, NY (US); John A. Rougas, Liverpool, NY (US); Edward M. Valovage, Memphis, NY (US); Brian Edward, Jamesville, NY (US)

(73) Assignee: Sensis Corporation, East Syracuse, NY (US)

( * ) Notice: Subject to any disclaimer, the term of this patent is extended or adjusted under 35 U.S.C. 154(b) by 13 days.

(21) Appl. No.: 12/658,217

(22) Filed: Feb. 4, 2010

(65) Prior Publication Data

US 2011/0187578 A1    Aug. 4, 2011

(51) Int. Cl.
*G01S 13/00*    (2006.01)
(52) U.S. Cl. ............................. 342/27; 342/59; 342/118
(58) Field of Classification Search .................... 342/27, 342/59, 118
See application file for complete search history.

(56) References Cited

U.S. PATENT DOCUMENTS

| | | | |
|---|---|---|---|
| 3,422,431 A | 1/1969 | Hafner | |
| 4,401,980 A | 8/1983 | Rittenbach et al. | |
| 4,458,240 A * | 7/1984 | Rittenbach et al. | 340/552 |
| 4,879,544 A * | 11/1989 | Maki et al. | 340/552 |
| 5,534,869 A * | 7/1996 | Harman | 342/27 |
| 7,009,471 B2 | 3/2006 | Elmore | |
| 7,567,154 B2 | 7/2009 | Elmore | |
| 7,675,408 B2 | 3/2010 | Kline | |
| 2002/0041232 A1* | 4/2002 | Harman | 340/541 |
| 2003/0190906 A1* | 10/2003 | Winick | 455/404.1 |
| 2005/0164666 A1* | 7/2005 | Lang et al. | 455/282 |
| 2006/0233046 A1* | 10/2006 | Fluhler et al. | 367/11 |
| 2007/0268124 A1* | 11/2007 | Berkman | 340/538 |
| 2008/0036597 A1* | 2/2008 | Harman | 340/552 |
| 2008/0211727 A1* | 9/2008 | Elmore | 343/773 |

FOREIGN PATENT DOCUMENTS

EP        0 272 785        6/1988
* cited by examiner

*Primary Examiner* — Timothy A Brainard
(74) *Attorney, Agent, or Firm* — Burr & Brown

(57) ABSTRACT

A conductive line radar comprising at least one signal surface wave launcher, which comprises a signal surface wave transceiver, which is physically attached to a power line. The signal surface wave transceiver transmits a wave signal along the power line with another signal radiating from the wave signal in a plurality of directions along the power line. The at least one signal surface wave transceiver receives reflected signals from a target within a distance of the power line. The at least one signal surface wave launcher includes at least one RF communications transceiver and can be inductively powered from the power line.

49 Claims, 22 Drawing Sheets
(1 of 22 Drawing Sheet(s) Filed in Color)

US 8,159,385 B2

CONDUCTIVE LINE COMMUNICATION APPARATUS AND CONDUCTIVE LINE RADAR SYSTEM AND METHOD

U.S. GOVERNMENT RIGHTS

This invention was made with United States Government support under N00174-04-D-4143-FG01 TI 045 awarded by the Naval EOD Technical Division. The United States Government has certain rights in the invention.

FIELD OF THE INVENTION

The present invention relates to communications systems and methods. In some aspects, the present invention relates to a communications system capable of transmitting a signal over long distances and to radar systems for detecting intrusions along a defined area, such as a perimeter or boundary.

BACKGROUND OF THE INVENTION

Modern communications systems and radar systems are increasingly complex and expensive to develop and field. The signals generated, by communications systems and radar systems are propagated into free space where the signal is attenuated by the free space environment as well as encountering interference from other free space radiated signals. The attenuation and interference cause a loss in distance the signal travels before the signal strength falls below a useful threshold.

Further, to provide communications systems and/or radar systems in remote areas requires large power generating equipment, which necessitates the construction of the necessary infrastructure to support these facilities in the remote areas. Additionally, for radar systems capable of detecting intrusions along a defined area or boundary and communications systems, distance and terrain features, such as abrupt changes in elevation; create "blind spots" for detecting potential intrusions.

For communications systems and intrusion detection radar systems, what is needed is a system and method to extend the distance signals generated by communications systems and intrusion detection radar systems travels before the signal strength falls below a useful threshold and mitigates or eliminates blind spots.

SUMMARY OF THE INVENTION

According to a first aspect of the present invention, there is provided a wide-area RF signal transmission and reception apparatus comprises at least one signal surface wave launcher, at least one RF communications transceiver with integrated antenna; and at least one signal processor. The signal surface wave launcher comprises a signal surface wave transceiver physically attached to a power line that transmits a wave signal along the power line, wherein the wave signal further comprises a modulated signal that radiates from the wave signal in a plurality of directions along the power line. The modulated signal radiates from the wave signal along the power line is receivable by a receiving device within a distance from the power line along a length of the power line.

In the wide-area RF signal transmission and reception apparatus, the distance can be a function of at least one of a type of transmitted waveform, transmitted power of the wave signal, diameter of the power line, sag and discontinuities in the power line. In a first embodiment of the present invention, the distance is not more than about 250 meters from the power line along the length of the power line. In some embodiments of the wide-area RF signal transmission and reception apparatus, the wide-area RF signal transmission and reception apparatus is inductively powered from the power line.

In some embodiments of the wide-area RF signal transmission and reception apparatus, the signal surface wave transceiver is paired with a second signal surface wave transceiver to form a transmit/receive pair. In these embodiments, the wave signal transmitted along the power line is received by an adjacent signal surface wave transceiver along the power line at a distance that can be a function of a type of transmitted waveform, transmitted power of the wave signal and diameter and physical configuration of the power line. In at least one embodiment of the present invention, a plurality of the transmit/receive pairs are installed along at least the power line to form the wide-area RF signal transmission and reception apparatus of a user selectable length. In these embodiments, each transmit/receive pair operates within a predetermined time slot based on a system-wide time reference to avoid interference within the wide-area RF signal transmission and reception apparatus. In these embodiments, the system-wide time reference is GPS or a system interface unit designated reference source that is adjusted in signal surface wave transceivers along the length of the power line. In a first embodiment, the distance the wave signal is transmitted is not more than about 800 meters.

In the wide-area RF signal transmission and reception apparatus, the wave signal transmitted from the power line by the signal surface wave transceiver can comprise a scattered wave. In some embodiments, the wave signal is a continuous wave (CW) signal. In other embodiments, the wave signal is a linear frequency modulated continuous wave (LFMCW) signal. In some embodiments, the wave signal is a stepped continuous wave (CW) signal having any combination of coding. In some embodiments, the wave signal is an ultra-wideband (UWB) signal. In other embodiments, the wave signal is a modulated signal using one of pulse position modulation (PPM), binary phase-shift keying (BPSK), differential phase-shift keying (DPSK), quadrature phase-shift keying (QPSK), multiple phase-shift keying (MPSK), continuous-phase frequency-shift keying (CPFSK), minimum shift keying (MSK), Gaussian minimum shift keying (GMSK).

In some embodiments of the wide-area RF signal transmission and reception apparatus, the wave signal transmitted along the power line by the signal surface wave transceiver can also comprise a Sommerfeld wave.

In some embodiments of the wide-area RF signal transmission and reception apparatus, the at least one RF communications transceiver with integrated antenna receives control signals from a control station. In some of these embodiments, the at least one RF communications transceiver with integrated antenna transmits control signals to an adjacent signal surface wave launcher to circumvent physical breaks in the power line. In some of these embodiments, the at least one RF communications transceiver with integrated antenna transmits the control signals to the adjacent signal surface wave launcher physically attached to a second power line that is not in direct physical contact with the power line.

According to a second aspect of the present invention, there is provided a method of transmitting an RF signal over a wide area using power lines, the method comprises transmitting a wave signal along a power line using at least one signal surface wave launcher, the signal surface wave launcher being physically attached to a first power line, wherein the RF signal radiates from the wave signal in a plurality of directions from the power line; and receiving the RF signal radiating from the wave signal in a plurality of directions from the power line when a receiving device is within a distance from the power line along a length of the power line. The signal surface wave launcher comprises a signal surface wave transceiver, at least one RF communications transceiver with integrated antenna, and at least one signal processor. In some embodiments, the method further comprises receiving control signals from a control station at the signal surface wave launcher using the at least one RF communications transceiver with integrated antenna.

In some embodiments of the method of the present invention, the method further comprises transmitting and receiving control signals between the signal surface wave launcher and an adjacent signal surface wave launcher using the at least one RF communications transceiver with integrated antenna.

In some embodiments, the method further comprises receiving the wave signal at a second signal surface wave transceiver along the power line. In some of these embodiments, the method further comprises retransmitting the wave signal at a second signal surface wave transceiver along the power line.

In some embodiments, the method further comprises pairing the signal surface wave transceiver with a second signal surface wave transceiver to form a transmit/receive pair. In some of these embodiments, the method further comprises forming a wide-area RF signal transmission and reception apparatus using a plurality of the transmit/receive pairs along at least the power line.

According to a third aspect of the present invention, there is provided a mono-static conductive line radar system comprising a signal surface wave launcher that is physically attached to a power line and the signal surface wave launcher comprises a signal surface wave transceiver, at least one RF communications transceiver with integrated antenna, and at least one signal processor. The signal surface wave transceiver transmits a wave signal along the power line, wherein a signal radiates from the wave signal in a plurality of directions from the power line. The signal surface wave transceiver receives reflected signals from a target from the signal radiated in a plurality of directions from the power line within a distance from the power line along a length of the power line, and the at least one signal processor detects the target from the reflected signals received from at least the signal surface wave transceiver. In some embodiments of the mono-static conductive line radar system, the signal surface wave launcher is inductively powered from the power line.

In some embodiments of the mono-static conductive line radar system of the present invention, a communications link is established for transmitting a signal through free space that that is not the signal used for the radar function and the signal is received by an adjacent signal surface wave transceiver that is separated from the signal surface wave transceiver by a distance that can be a function of at least one of a type of transmitted waveform, transmitted power of the wave signal, diameter and physical configuration of the power line, including sag and discontinuities in the power line. In some embodiments, the distance is not more than about 800 meters. In other embodiments, the distance can be a function of a link budget for a command and control system.

In some embodiments of the mono-static conductive line radar system, a target entering an area of surveillance defined at least by the distance from the power line along the length of the power line is detected from an increase in signal amplitude from reflected signals from the target received by the signal surface wave transceiver. In some embodiments, the power line can act as the antenna, and the direction of the transmitted wave can be multi-directional due to discontinuities of the antenna, wherein the reflected signals from the at least one target comprises at least a first signal having an positive doppler component and at least a second signal having a negative doppler component at least when the at least one target is physically located within the operational range of the transceiver and within the distance along the length of the power line. In these embodiments, the distance at which the target is detected can be a function of a type of transmitted waveform, transmitted power of the wave signal, diameter and physical configuration of the power line and at least one of radar cross section of the target, speed of the target, number of bright points and physical size of the target. In some embodiments, the distance on the ground is within about 250 meters of the power line along the length of the power line. In some of these embodiments, the distance in low airspace is within about 1000 meters of the power line along the length of the power line.

In some embodiments, the mono-static conductive line radar system further comprises an accelerometer to measure at least one of wind movement and vibration of the power line, and the at least one signal processor removes effects of Doppler resulting from the at least one of wind movement and vibration of the power line measured by the accelerometer from signals received at the signal surface wave transceiver. In some of these embodiments, the accelerometer is a MEMS accelerometer.

In the mono-static conductive line radar system of the present invention, the wave signal transmitted along the power line by the signal surface wave transceiver can comprise a Sommerfeld wave.

In some embodiments, the wave signal is a continuous wave (CW) signal. In other embodiments, the wave signal is a linear frequency modulated continuous wave (LFMCW) signal. In some embodiments, the wave signal is an ultra-wideband (UWB) signal. In other embodiments, the wave signal is a modulated signal using one of pulse position modulation (PPM), binary phase-shift keying (BPSK), differential phase-shift keying (DPSK), quadrature phase-shift keying (QPSK), multiple phase-shift keying (MPSK), continuous-phase frequency-shift keying (CPFSK), minimum shift keying (MSK), Gaussian minimum shift keying (GMSK), stepped CW and coded waveforms.

In some embodiments of the mono-static conductive line radar system, the at least one signal processor estimates a size of the target from the reflected signals received from the target at the signal surface wave transceiver. In other embodiments, the at least one signal processor estimates a distance between the target and the power line from the reflected signals received from the target at the signal surface wave transceiver. In some embodiments, the at least one signal processor estimates a speed of the target from the reflected signals received from the target at the signal surface wave transceiver.

In some embodiments, the at least one RF communications transceiver with integrated antenna receives control signals from a control station and transmits target detections to the control station when the target is detected. In some of these embodiments, the at least one RF communications transceiver with integrated antenna transmits the control signals to an adjacent signal surface wave launcher to circumvent at least one physical break in the power line. In other embodiments, the at least one RF communications transceiver with integrated antenna transmits the control signals to an adjacent signal surface wave launcher to bypass a failed RF communications transceiver. In some embodiments, the at least one RF communications transceiver with integrated antenna transmits control signals to an adjacent signal surface wave launcher that is physically attached to a second power line that is not in direct physical contact with the first power line.

In some embodiments, the mono-static conductive line radar system further comprises an acoustic sensor co-located with at least one of the plurality of the mono-static conductive line radars to confirm the mono-static conductive line radar system detection of the target from the reflected signals. In other embodiments, the mono-static conductive line radar system further comprises an infrared (IR) sensor co-located with at least one of the plurality of the mono-static conductive line radars to confirm the mono-static conductive line radar system detection of the target from the reflected signals. In some embodiments, the mono-static conductive line radar system further comprises a video sensor co-located with at least one of the plurality of the mono-static conductive line radars to confirm the mono-static conductive line radar system detection of the target from the reflected signals. In some embodiments, the mono-static conductive line radar system further comprises an ultra-sonic sensor co-located with at least one of the plurality of the mono-static conductive line radars to confirm the mono-static conductive line radar system detection of the target from the reflected signals.

In some embodiments of the present invention, a plurality of the mono-static conductive line radars are installed along at least the power line to form the mono-static conductive line radar system of a user selectable length.

According to a fourth aspect of the present invention, there is provided a method of detecting a target using a mono-static conductive line radar, the method comprises transmitting a wave signal along a power line from the mono-static conductive line radar mounted on the power line, wherein a signal radiates from the wave signal in a plurality of directions from the power line, receiving reflected signals from a target within a distance from the power line along a length of the power line at the signal surface wave transceiver from the signal radiated in the plurality of directions from the power line, and detecting the target from the reflected signals received at the signal surface wave transceiver when the target is within the distance from the power line. The mono-static conductive line radar comprises a signal surface wave transceiver physically attached to the power line, at least one RF communications transceiver with integrated antenna, and at least one signal processor.

In some embodiments, the method further comprises operating each of the plurality of mono-static conductive line radars within a predetermined time slot based on a system-wide time reference to avoid interference within the mono-static conductive line radar system. In some embodiments, the method further comprises measuring at least one of wind movement and vibration of the power line with an accelerometer, calculating effects of Doppler resulting from the at least one of wind movement and vibration of the power line and removing the effects of Doppler in the at least one signal processor from the reflected signals received from the target at the signal surface wave transceiver.

In some embodiments, the method further comprises estimating a size of the target in the at least one signal processor from the reflected signals received from the target. In other embodiments, the method further comprises estimating a distance between the target and the power line in the at least one signal processor from the reflected signals received from the target. In some embodiments, the method further comprises estimating a speed of the target in the at least one signal processor from the reflected signals received from the target.

In some embodiments, the method further comprises receiving control signals from a control station at the signal surface wave launcher using at least one RF communications link. In other embodiments, the method further comprises transmitting and receiving control signals between the surface wave launcher and an adjacent signal surface wave launcher using the at least one communications transceiver with integrated antenna.

In some embodiments, the method further comprises confirming the detection of the target from the reflected signals using an acoustic sensor co-located with the mono-static conductive line radar. In other embodiments, the method further comprises confirming the detection of the target from the reflected signals using an infrared (IR) sensor co-located with the mono-static conductive line radar. In some embodiments, the method further comprises confirming the detection of the target from the reflected signals using a video sensor co-located with the mono-static conductive line radar. In some embodiments, the method further comprises confirming the detection of the target from the reflected signals using an ultra-sonic sensor co-located with the mono-static conductive line radar.

In some embodiments, the method further comprises monitoring a status of the signal surface wave launcher using the at least one RF communications transceiver with integrated antenna. In other embodiments, the method further comprises setting up the signal surface wave launcher for transmission using the at least one RF communications transceiver with integrated antenna.

According to a fifth aspect of the present invention, there is provided a bi-static conductive line radar system comprises at least one bi-static conductive line radar comprises a first signal surface wave launcher physically attached to a first power line, the first signal surface wave launcher comprises a first signal surface wave transmitter and a first signal surface wave receiver, at least a first RF communications transceiver with integrated antenna, and at least a first signal processor, and a second signal surface wave launcher physically attached to a second power line, the second power line being substantially parallel to the first power line and the second signal surface wave launcher is separated from the first signal surface wave transmitter by a distance. The second signal surface wave launcher comprises a second signal surface wave transmitter and a second signal surface wave receiver, at least a second RF communications transceiver with integrated antenna; and at least a second signal processor. The first signal surface wave transmitter transmits a wave signal along the first power line and a signal radiates from the wave signal in a plurality of directions from the first power line. At least one of the first signal surface wave receiver and the second signal surface wave receiver receives reflected signals from at least one target from the signal radiated in a plurality of directions from the first power line within a distance from the first power line along a length of the first power line, and at least one of the first signal processor and the second signal processor detects the at least one target from the reflected signals received by at least one of the first signal surface wave receiver and the second signal surface wave receiver.

In some embodiments of the bi-static conductive line radar system, the first signal surface wave launcher is inductively powered from the first power line and/or the second signal surface wave launcher is inductively powered from the second power line. In the bi-static conductive line radar system, the distance between the first signal surface wave transmitter and the second signal surface wave receiver can be a function of a type of transmitted waveform, transmitted power of the wave signal and diameter and physical configuration of the power line or power cable. In some embodiments, the distance is not more than about 800 meters. In other embodiments, distance can be a function of a link budget for a command and control system.

In some embodiments of the bi-static conductive line radar system, the at least one target entering an area of surveillance defined at least by the distance from the power line along the length of the power line is detected from an increase in signal amplitude from reflected signals from the at least one target received by at least one of the first signal surface wave receiver and the second signal surface wave receiver. In these embodiments, the power line can act as the antenna, and the direction of the transmitted wave can be multi-directional due to discontinuities of the antenna, wherein the reflected signals from the at least one target comprise at least a first signal having an positive doppler component and at least a second signal having a negative doppler component at least when the at least one target is physically located within the operational range of the transceiver and within the distance along the length of the power line.

In some embodiments of the bi-static conductive line radar system, the distance at which the at least one target is detected can be a function of a type of transmitted waveform, transmitted power of the wave signal, diameter and physical configuration of the power line and at least one of radar cross section of the at least one target, speed of the at least one target, number of bright points and physical size of the at least one target. In some of these embodiments, the distance on the ground is within about 250 meters of the power line along the length of the power line and the distance in low airspace within about 1000 meters of the power line along the length of the power line.

In some embodiments, the bi-static conductive line radar system further comprises a first accelerometer to measure at least one of wind movement and vibration of the first power line, wherein at least the first signal processor removes effects of Doppler resulting from the at least one of wind movement and vibration of the first power line measured by the first accelerometer from signals received at least at the first signal surface wave receiver. In some of these embodiments, the first accelerometer is a MEMS accelerometer. In some embodiments, the bi-static conductive line radar system further comprises a second accelerometer to measure at least one of wind movement and vibration of the second power line, wherein at least the second signal processor removes effects of Doppler resulting from the at least one of wind movement and vibration of the second power line measured by the second accelerometer from signals received at least at the second signal surface wave receiver. In some of these embodiments, the second accelerometer is a MEMS accelerometer.

In the bi-static conductive line radar system, the wave signal transmitted along the power line by the signal surface wave transceiver can comprise a Sommerfeld wave.

In some embodiments, the wave signal is a continuous wave (CW) signal. In other embodiments, the wave signal is a linear frequency modulated continuous wave (LFMCW) signal or an ultra-wideband (UWB) signal. In some embodiments, the wave signal is a modulated signal using one of pulse position modulation (PPM), binary phase-shift keying (BPSK), differential phase-shift keying (DPSK), quadrature phase-shift keying (QPSK), multiple phase-shift keying (MPSK), continuous-phase frequency-shift keying (CPFSK), minimum shift keying (MSK), Gaussian minimum shift keying (GMSK), stepped CW and coded waveforms.

In some embodiments of the bi-static conductive line radar system, at least one of the first signal processor and the second signal processor estimates a size of the at least one target from the reflected signals. In other embodiments, at least the first signal processor estimates a distance between the at least one target and the first power line from the reflected signals. In some embodiments, at least the second signal processor estimates a distance between the at least one target and the second power line from the reflected signals.

In some embodiments of the bi-static conductive line radar system, at least one of the first signal processor and the second signal processor estimates a speed of the at least one target from the reflected signals. In other embodiments, at least one of the first RF communications transceiver with integrated antenna and the second RF communications transceiver with integrated antenna receives control signals, from a control station and transmits target detections to the control station when the at least one target is detected.

In some embodiments, at least one of the first RF communications transceiver with integrated antenna and the second RF communications transceiver with integrated antenna transmits control signals to circumvent at least one physical break in at least one of the first power line and the second power line. In other embodiments, at least one of the first RF communications transceiver with integrated antenna and the second RF communications transceiver with integrated antenna transmits control signals to bypass a failed RF communications transceiver in one of the first power line and the second power line.

In some embodiments, the bi-static conductive line radar system further comprises an acoustic sensor co-located with at least one of the first signal surface wave launcher and the second signal surface wave launcher to confirm the bi-static conductive line radar system detection of the at least one target from the reflected signals. In other embodiments, the bi-static conductive line radar system further comprises an infrared (IR) sensor co-located with at least one of the first signal surface wave launcher and the second signal surface wave launcher to confirm the bi-static conductive line radar system detection of the at least one target from the reflected signals. In some embodiments, the bi-static conductive line radar system further comprises a video sensor co-located with at least one of the first signal surface wave launcher and the second signal surface wave launcher to confirm the bi-static conductive line radar system detection of the at least one target from the reflected signals. In some embodiments, the bi-static conductive line radar system further comprises an ultra-sonic sensor co-located with at least one of the first signal surface wave launcher and the second signal surface wave launcher to confirm the bi-static conductive line radar system detection of the at least one target from the reflected signals.

In some embodiments, pluralities of the bi-static conductive line radars are installed along at least the power line to form the bi-static conductive line radar system of a user selectable length.

According to a sixth aspect of the present invention, there is provided a method of detecting a target using a bi-static conductive line radar, the method comprises transmitting a wave signal along a first power line using a first signal surface wave launcher, the first signal surface wave launcher being mounted on the first power line, wherein a signal radiates from the wave signal in a plurality of directions from the first power line along a length of the first power line, receiving reflected signals from at least one target within a distance from the first power line at least at one of the first signal surface wave launcher and a second signal surface wave launcher from the signal radiated in the plurality of directions from the first power line, and detecting the at least one target from the reflected signals received by at least one of the first signal surface wave receiver and the second signal surface wave receiver. The first signal surface wave launcher comprises a first signal surface wave transmitter and a first signal surface wave receiver, at least a first RF communications transceiver with integrated antenna and at least a first signal processor, and the second signal surface wave launcher comprises a second signal surface wave transmitter and a second signal surface wave receiver, at least a second RF communications transceiver with integrated antenna and at least a second signal processor, with the second signal surface wave launcher being mounted on a second power line and separated from the first signal surface wave transmitter.

In some embodiments, the method further comprises measuring the at least one of wind movement and vibration of the first power line with an accelerometer, calculating effects of Doppler resulting from the at least one of wind movement and vibration of the first power line and removing the effects of Doppler from the reflected signals received from the at least one target at least at the first signal processor. In other embodiments, the method further comprises measuring the at least one of wind movement and vibration of the second power line with an accelerometer, calculating effects of Doppler resulting from the at least one of wind movement and vibration of the second power line and removing the effects of Doppler from the reflected signals received from the at least one target at least at the second signal processor.

In some embodiments, the method further comprises estimating a size of the at least one target in at least at one of the first signal processor and the second signal processor from the reflected signals received from the at least one target. In other embodiments, the method further comprises estimating a distance between the at least one target and the power line in at least at one of the first signal processor and the second signal processor from the reflected signals received from the at least one target. In some embodiments, the method further comprises estimating a speed of the at least one target in at least at one of the first signal processor and the second signal processor from the reflected signals received from the at least one target.

In some embodiments, the method further comprises receiving control signals at least at one of the first signal surface wave launcher and the second signal surface wave launcher using at least one of the first RF communications transceiver with integrated antenna and the second RF communications transceiver with integrated antenna. In other embodiments, the method further comprises transmitting the detection of the at least one target to a control station using at least at one of the first communications transceiver with integrated antenna and the second communications transceiver with integrated antenna. In some embodiments, the method further comprises transmitting and receiving control signals between the first signal wave launcher and the second signal surface wave launcher using at least the first communications transceiver with integrated antenna and the second communications transceiver with integrated-antenna.

In some embodiments; the method further comprises confirming the detection of the at least one target from the reflected signals using an acoustic sensor co-located with at least one of the first signal wave launcher and the second signal surface wave launcher. In other embodiments, the method further comprises confirming the detection of the at least one target from the reflected signals using an infrared (IR) sensor co-located with at least one of the first signal wave launcher and the second signal surface wave launcher. In some embodiments, the method further comprises confirming the detection of the at least one target from the reflected signals using a video sensor co-located with at least one of the first signal wave launcher and the second signal surface wave launcher. In some embodiments, the method further comprises confirming the detection of the at least one target from the reflected signals using an ultra-sonic sensor co-located with at least one of the first signal wave launcher and the second signal surface wave launcher.

In some embodiments, the method further comprises monitoring a status of at least one of the first signal surface wave launcher and the second signal surface wave launcher using at least one of the first RF communications transceiver with integrated antenna and the second RF communications transceiver with integrated antenna. In other embodiments, the method further comprises setting up at least the first signal surface wave launcher for transmission using at least the first RF communications transceiver with integrated antenna. In some embodiments, the method further comprises setting up at least the second signal surface wave launcher for transmission using at least the second RF communications transceiver with integrated antenna.

According to a seventh aspect of the present invention, there is provided a multi-static conductive line radar system comprises at least a first signal surface wave launcher physically attached to a first power line, a second signal surface wave launcher physically attached to a second power line, the second power line being substantially parallel to the first power line, and a third signal surface wave launcher physically attached to the second power line. The second signal surface wave launcher is separated from the first signal surface wave transmitter by a distance in a first direction, and the third signal surface wave launcher is separated from the first signal surface wave transmitter by a distance in a second direction. The first signal surface wave launcher comprises at least a first signal surface wave transmitter facing in the first direction and a second signal surface wave transmitter facing in the second direction, at least a first signal surface wave receiver, at least a first RF communications transceiver with integrated antenna; and at least a first signal processor. The second signal surface wave launcher comprises at least a second signal surface wave receiver, at least a second RF communications transceiver with integrated antenna, and at least a second signal processor. The third signal surface wave launcher comprises at least a third signal surface wave receiver, at least a third RF communications transceiver with integrated antenna, and at least a third signal processor. The first signal surface wave transmitter transmits a wave signal along the first power line in the first direction and the second signal surface wave transmitter transmits the wave signal along the first power line in the second direction, wherein a signal radiates from the wave signal in a plurality of directions from the first power line and at least one of the first signal surface wave receiver, the second signal surface wave receiver and the third signal surface wave receiver receives reflected signals from at least one target from the signal radiated in a plurality of directions from the first power line within the distance from the first power line along a length of the first power line.

In some embodiments of the multi-static conductive line radar system, at least one of the first signal surface wave launcher, the second signal surface wave launcher and the third signal surface wave launcher is inductively powered from the respective power line. In some embodiments, the distance between at least one of the second signal surface wave receiver and the first signal surface wave transmitter and/or the third signal surface wave receiver and the second signal surface wave transmitter can be a function of a type of transmitted waveform, transmitted power of the wave signal and diameter and physical configuration of the power line. In some embodiments, the distance is not more than about 800 meters.

In some embodiments of the multi-static conductive line radar system, the first signal surface wave transmitter is paired with the second signal surface wave receiver to form a first transmit/receive pair and the second signal surface wave transmitter is paired with the third signal surface wave receiver to form a second transmit/receive pair. In other embodiments, a plurality of the transmit/receive pairs are installed along at least the power line to form the multi-static conductive line radar system of a user selectable length. In these embodiments, at least the first transmit/receive pair and the second transmit/receive pair can receive a time slot based on a system-wide time reference to avoid interference within the multi-static conductive line radar system. In some embodiments of the multi-static conductive line radar system, the system-wide time reference is GPS or a system interface unit designated reference source that is adjusted in signal surface wave transceivers along the length of the power line.

In some embodiments of the multi-static conductive line radar system, the at least one target entering an area of surveillance defined at least by the distance from the first power line along the length of the first power line is detected from an increase in signal amplitude from reflected signals from the at least one target received by at least one of the first signal surface wave receiver, the second signal surface wave receiver and the third signal surface wave receiver. In some embodiments, the multi-static conductive line radar system further comprises a first accelerometer to measure at least one of wind movement and vibration of the first power line, wherein at least the first signal processor removes effects of Doppler resulting from the at least one of wind movement and vibration of the first power line measured by the first accelerometer from signals received at least at the first signal surface wave receiver. In some of these embodiments, the first accelerometer is a MEMS accelerometer. In other embodiments, the multi-static conductive line radar system further comprises a second accelerometer to measure at least one of wind movement and vibration of the second power line, wherein at least one of the second signal processor and the third signal processor removes effects of Doppler resulting from the at least one of wind movement and vibration of the second power line measured by the second accelerometer from signals received at least at the second signal surface wave receiver and the third surface wave receiver. In some of these embodiments, the second accelerometer is a MEMS accelerometer.

In some embodiments of the multi-static conductive line radar system, the power line can act as the antenna, and the direction of the transmitted wave can be multi-directional due to discontinuities of the antenna, wherein the reflected signals from the at least one target comprise at least a first signal having an positive doppler component and at least a second signal having a negative doppler component at least when the at least one target is physically located within the operational range of the transceiver and within the distance along the length of the power line. In some embodiments, the multi-static conductive line radar system detects the at least one target on the ground or in low airspace at the distance that can be a function of type of transmitted waveform, transmitted power of the wave signal, diameter and physical configuration of the power line and at least one of radar cross section of the at least one target, speed of the at least one target, number of bright points and physical size of the at least one target. In some embodiments, the distance on the ground is within about 250 meters of the first power line along the length of the first power line. In other embodiments, the distance in low airspace within about 1000 meters of the power line along the length of the power line.

In some embodiments of the multi-static conductive line radar system, the wave signal transmitted along the first power line by at least one of the first signal surface wave transmitter and the second signal surface wave transmitter can comprise a Sommerfeld wave signal.

In some embodiments, the wave signal is a continuous wave (CW) signal. In other embodiments, the wave signal is a linear frequency modulated continuous wave (LFMCW) signal or an ultra-wideband (UWB) signal. In some embodiments, the wave signal is a modulated signal using one of pulse position modulation (PPM), binary phase-shift keying (BPSK), differential phase-shift keying (DPSK), quadrature phase-shift keying (QPSK), multiple phase-shift keying (MPSK), continuous-phase frequency-shift keying (CPFSK), minimum shift keying (MSK), Gaussian minimum shift keying (GMSK), stepped CW and coded waveforms.

In some embodiments of the multi-static conductive line radar system, at least one of the first signal processor, the second signal processor and the third signal processor estimates a size of the at least one target from the reflected signals. In other embodiments, at least one of the first signal processor, the second signal processor and the third signal processor estimates a distance between the at least one target and the first power line from the reflected signals. In some embodiments, at least one of the first signal processor, the second signal processor and the third signal processor estimates a speed of the at least one target from the reflected signals. In some embodiments, at least one of the first RF communications transceiver with integrated antenna, the second RF communications transceiver with integrated antenna and the third RF communications transceiver with integrated antenna receives control signals from a control station and transmits target detections to the control station when the at least one target is detected. In some embodiments, the first signal surface wave launcher further comprises at least a first RF communications transceiver with integrated antenna, the second signal surface wave launcher further comprises at least a second RF communications transceiver with integrated antenna, and the third signal surface wave launcher further comprises at least a third RF communications transceiver with integrated antenna for transmitting control signals to circumvent at least one physical break in at least one of the first power line and the second power line.

In some embodiments, the multi-static conductive line radar system further comprises an acoustic sensor co-located with at least one of the first signal surface wave launcher, the second signal surface wave launcher and the third signal surface wave launcher to confirm the multi-static conductive line radar system detection of the at least one target from the reflected signals. In other embodiments, the multi-static conductive line radar system further comprises an infrared (IR) sensor co-located with at least one of the first signal surface wave launcher, the second signal surface wave launcher and the third signal surface wave launcher to confirm the multi-static conductive line radar system detection of the at least one target from the reflected signals.

In some embodiments, the multi-static conductive line radar system further comprises a video sensor co-located with at least one of the first signal surface wave launcher, the second signal surface wave launcher and the third signal surface wave launcher to confirm the multi-static conductive line radar system detection of the at least one target from the reflected signals. In some embodiments, the multi-static conductive line radar system further comprises an ultra-sonic sensor co-located with at least one of the first signal surface wave launcher, the second signal surface wave launcher and the third signal surface wave launcher to confirm the multi-static conductive line radar system detection of the at least one target from the reflected signals.

In some embodiments, at least one of the second signal surface wave launcher and the third signal surface wave launcher further comprises a second signal surface wave transmitter that retransmits the wave signal along the first power line. In other embodiments, the first signal surface wave transmitter facing in a first direction and the second signal surface wave transmitter facing in a second direction is a single bi-directional transmitter.

According to an eighth aspect of the present invention, there is provided a method of detecting a target, using a multi-static conductive line radar, the method comprises transmitting a wave signal along a first power line using a first signal surface wave launcher mounted on the first power line, wherein the first signal surface wave transmitter transmits about half of the wave signal along a first power line in a first direction and about half of the wave signal along the first power line in a second direction, and a signal radiates from the wave signal in a plurality of directions from the first power line, receiving the wave signal at least at one of a second signal surface wave launcher and a third signal surface wave launcher, receiving reflected signals from at least one target from the signal radiated in the plurality of directions from at least the first power line at least at one of the first signal surface wave receiver, the second signal surface wave receiver and the third signal surface wave receiver, and detecting the at least one target within a distance from at least the first power line from the reflected signals received at least at one of the first signal surface wave receiver, the second signal surface wave receiver and the third signal surface wave receiver. The first signal surface wave launcher comprises a first signal surface wave transmitter facing in at least a first direction and configured to transmit the wave signal in the first direction and the second direction, at least a first signal surface wave receiver, at least a first RF communications transceiver with integrated antenna, and at least a first signal processor, the second signal surface wave launcher comprises at least a second signal surface wave receiver, at least a second RF communications transceiver with integrated antenna, and at least a second signal processor, the second signal surface wave launcher being mounted on the first power line or a second power line, and the third signal surface wave launcher comprises at least a third signal surface wave receiver, at least a third RF communications transceiver with integrated antenna, and at least a third signal processor, the third signal surface wave launcher being mounted on the first power line or the second power line.

In some embodiments, the method further comprises measuring at least one of wind movement and vibration of the first power line with an accelerometer, calculating effects of Doppler resulting from the at least one of wind movement and vibration of the first power line and removing the effects of Doppler from the reflected signals received from the at least one target. In other embodiments, the method further comprises measuring at least one of wind movement and vibration of the second power line with an accelerometer, calculating effects of Doppler resulting from the at least one of wind movement and vibration of the second power line and removing the effects of Doppler from the reflected signals received from the at least one target.

In some embodiments, the method further comprises estimating a size of the at least one target from the reflected signals. In other embodiments, the method further comprises estimating a distance between the at least one target and the power line from the reflected signals. In some embodiments, the method further comprises estimating a speed of the at least one target from the reflected signals.

In some embodiments, the method further comprises receiving control signals from a control station at least at one of the first signal surface wave launcher, the second signal surface wave launcher and the third signal surface wave launcher using at least one of the first RF communications link, the second RF communications link and the third RF communications link. In other embodiments, the method further comprises transmitting the detection of the at least one target to a control station from the reflected signals from at least at one of the first signal surface wave launcher, the second signal surface wave launcher and the third signal surface wave launcher.

In some embodiments, the method further comprises transmitting and receiving control signals between at least the first signal wave launcher and the second signal surface wave launcher using at least the first communications transceiver with integrated antenna and the second communications transceiver with integrated antenna. In other embodiments, the method further comprises transmitting and receiving control signals between at least the first signal wave launcher and the third signal surface wave launcher using at least the first communications transceiver with integrated antenna and the third communications transceiver with integrated antenna.

In some embodiments, the method further comprises confirming the detection of the at least one target from the reflected signals using an acoustic sensor co-located with at least one of the first signal surface wave launcher, the second signal surface wave launcher and the third signal surface wave launcher. In other embodiments, the method further comprises confirming the detection of the at least one target from the reflected signals using an infrared (IR) sensor co-located with at least one of the first signal surface wave launcher, the second signal surface wave launcher and the third signal surface wave launcher. In some embodiments, the method further comprises confirming the detection of the at least one target from the reflected signals using a video sensor co-located with at least one of the first signal surface wave launcher, the second signal surface wave launcher and the third signal surface wave launcher. In some embodiments, the method further comprises confirming the detection of the at least one target from the reflected signals using an ultra-sonic sensor co-located with at least one of the first signal surface wave launcher, the second signal surface wave launcher and the third signal surface wave launcher.

In some embodiments, the method further comprises monitoring a status of at least one of the first signal surface wave launcher, the second signal surface wave launcher and the third signal surface wave launcher using at least one of the first RF communications transceiver with integrated antenna, the second RF communications transceiver with integrated antenna and the third RF communications transceiver with integrated antenna. In other embodiments, the method further comprises setting up at least one of the first signal surface wave launcher, the second signal surface wave launcher, and the third signal surface wave launcher for transmission using at least one of the first RF communications transceiver with integrated antenna, the second RF communications transceiver with integrated antenna and the third RF communications transceiver with integrated antenna.

In some embodiments, the method further comprises pairing the first signal surface wave transmitter with the second signal surface wave receiver to form a first transmit/receive pair and pairing the second signal surface wave transmitter with the third signal surface wave receiver to form a second transmit/receive pair. In some of these embodiments, the method further comprises receiving the wave signal at the second transmit/receive pair adjacent to the first transmit/ receive pair and sequentially transmitting the wave signal from the second transmit/receive pair to an adjacent transmit/receive pair of the plurality of the transmit/receive pairs as a means to extend the area of coverage over the length covered by a system comprises a plurality of transmit/receive pairs.

In other embodiments, the method further comprises forming the multi-static conductive line radar of a user selectable length using a plurality of the transmit/receive pairs along at least the first power line and the second power line. In some of these embodiments, the method further comprises receiving a time slot at each of the plurality of the transmit/receive pairs based on a system-wide time reference to avoid interference within the multi-static conductive line radar.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
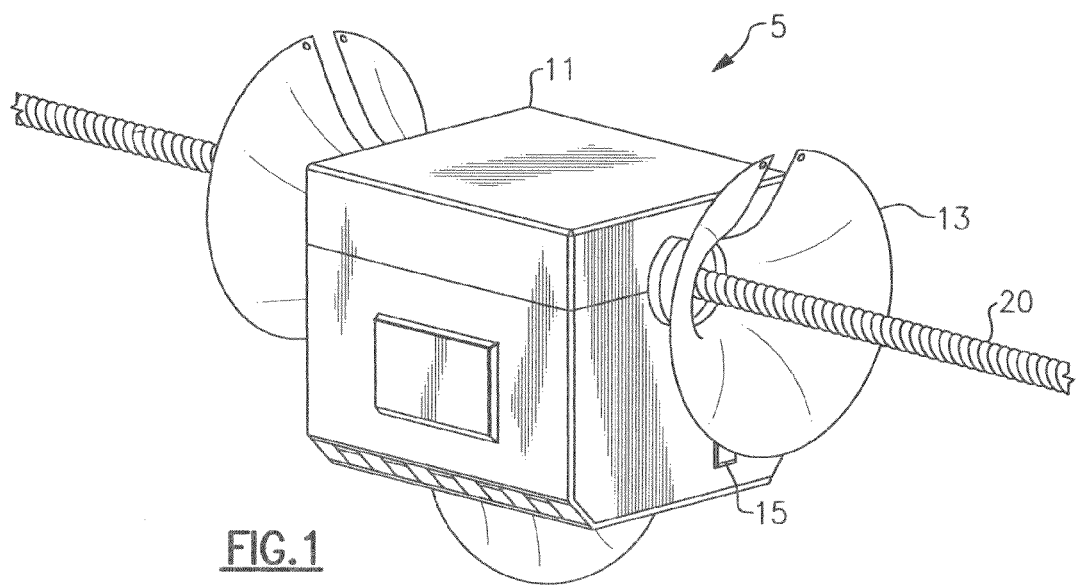
FIG. 1 is a drawing of an embodiment of a signal surface wave launcher in an RF signal transmission and reception apparatus according to the present invention.

FIG. 1 depicts an embodiment of a wide-area RF signal transmission and reception apparatus which comprises: at least one signal surface wave launcher 5. The signal surface wave launcher 5 comprises a signal surface wave transceiver 10 (not shown) physically attached to a power line 20, at least one RF communication link 15, and at least one signal processor 17 (not shown). The signal surface wave transceiver 10 transmits a wave signal 30 along the power line 20, with the wave signal 30, shown in FIG. 3, including a communications signal 31 that radiates from the wave signal in a plurality of directions along the power line 20 that are received by users within a distance from the power line 20 along a length of the power line 20.

The signal surface wave transceiver 10 of the signal surface wave launcher 5 comprises a surface wave transceiver housing 11, at least one metallic housing and an input connector that are housed within the surface wave transceiver housing 11, and at least one flared horn 13, which surrounds the power line 20, as shown in FIG. 1. The at least one signal processor 17 and electronics for the at least one RF communication link 15 can be physically located within the interior of surface wave transceiver housing 11, shown in FIG. 1, for example.

The surface wave transceiver housing 11 is attached to a portion of the power line 20 and can be formed of a metallic or a non-metallic material. The surface wave transceiver housing 11 covers and protects the metallic housing and coaxial input connector from the external environment. The surface wave transceiver housing 11 is typically formed in a rectangular shape, but can be formed in virtually any shape that will cover the metallic housing and coaxial input connector. In some embodiments, the surface wave transceiver housing 11 further comprises a hardwired input connector, an infrared input connector and/or a light signal connector for receiving data and/or command and control signals.

Figure 2A:
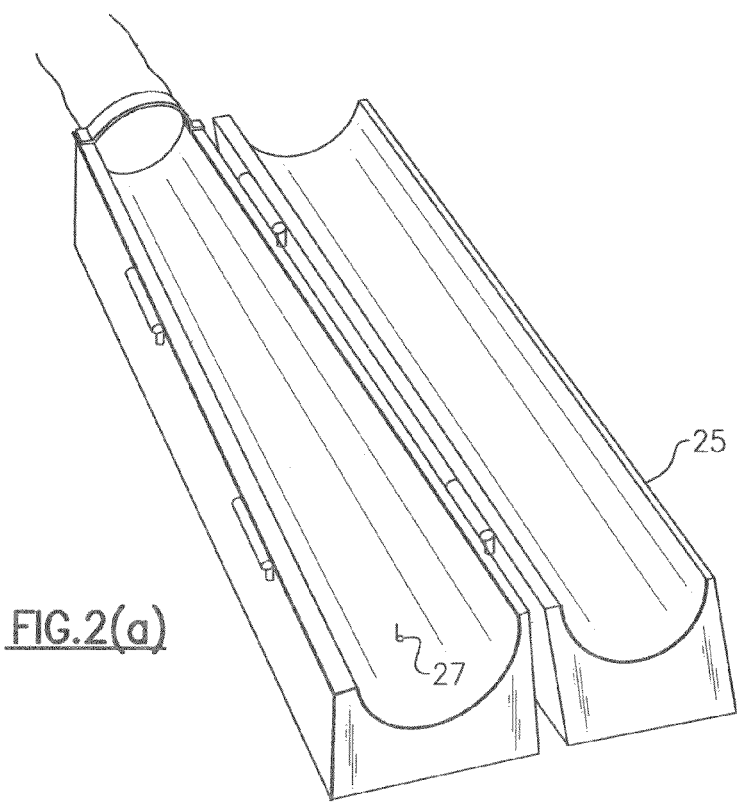
FIG. 2(a) is a drawing of an embodiment of a metallic housing of a signal surface wave launcher in an RF signal transmission and reception apparatus according to the present invention.

The metallic housing 25 is formed to surround or enclose a portion of the power line. The metallic housing 25 can be formed in a tubular clamshell type configuration, as shown in FIG. 2(a). The metallic housing 25 can also have alternative shapes that can be secured within the surface wave transceiver housing 11 and enclose a portion of the power line 20 without damaging the power line 20.

Figure 2B:
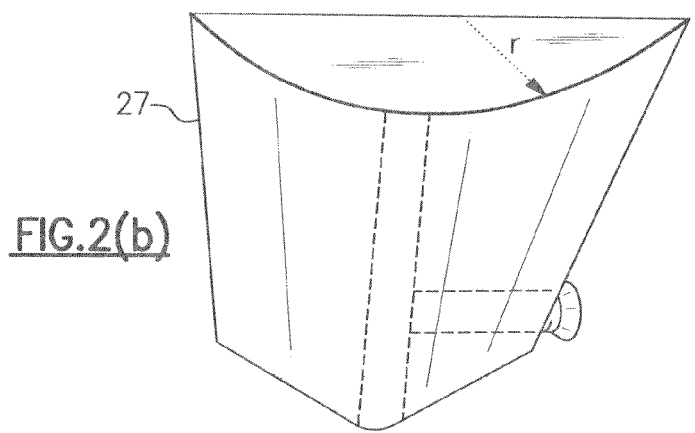
FIG. 2(b) is a drawing of an embodiment of a probe for connecting the coaxial connector of a signal surface wave launcher to the power line in an RF signal transmission and reception apparatus according to the present invention.

The probe 27 can have a straight shape or a tapered shape, as shown in FIG. 2(b). The probe 27 physically interfaces and adapts the coaxial transmission cable to the power line to a coaxial transmission line mode to launch the wave signal on the power line 20 via flared horn 13.

The flared horn 13 is used to launch the wave signal 30, such as a transverse electromagnetic wave, along the power line 20. The flared horn 13 is formed in a way that can be installed over an existing power line 20, as shown in FIG. 1. The flared horn 20 also receives a wave signal 30 transmitted by another surface wave transceiver along the power line 20 and transfers the received wave signal to the one or more signal processors 17 contained within the surface wave transceiver housing 11.

Figure 1A:
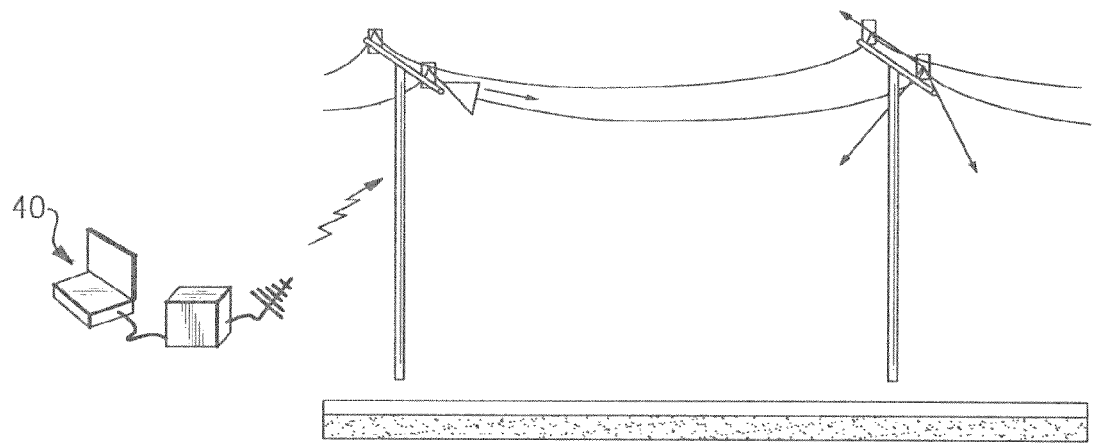
FIG. 1(a) is a representation of a remote command and control station with a wireless communications link for sending commands and receiving status from a system.

The RF signal transmission and reception apparatus further comprises at least one RF communication link 15. The RF communications link 15 provides one means for receiving data in a free space radiated RF signal from the command and control system 40, as shown in FIG. 1A. In one embodiment, the at least one RF communications link 15 is an RF communications transceiver with integrated antenna, as shown in FIG. 1.

The at least one signal processor 17 receives the data from the RF communications link 15 and processes the data to convert the received information into data that can be transmitted in the wave signal 30. The signal processor 17 also receives wave signals 30 transmitted from another signal surface wave launcher 5 and can re-transmit the received wave signal to another signal surface wave launcher 5 using the flared horn 13 on the opposite end of the surface wave transceiver housing 11 or via the RF communications link 15, as directed by the command and control system 40.

The command and control system 40 can transmit instructions and data to one or more of the signal surface wave launchers 5 via the RF communications link 15, a hardwired communications link, such as a coaxial cable, an infrared link or light link that include instructions to transmit a wave signal 30 along the power line 20.

An embodiment of a method of transmitting an RF signal over a wide area using power lines 20 comprises transmitting a wave signal 30 along at least one power line 20 using at least one signal surface wave launcher 5, the signal surface wave launcher 5 being physically attached to a power line 20, wherein the RF signal radiates from the wave signal 30 in a plurality of directions from the power line 20; and receiving the RF signal radiating from the wave signal 30 in a plurality of directions from the power line 20 when a receiving device 35 is within a distance from the power line 20 along a length of the power line 20. In some embodiments, the method further comprises receiving control signals from a command and control system 40 at the signal surface wave launcher 5 using the at least one RF communications link 15.

Figure 3:
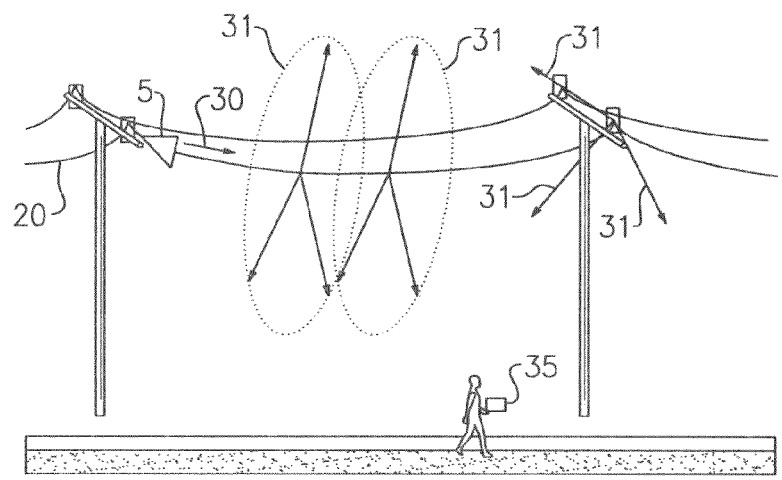
FIG. 3 depicts a wave signal traveling along and radiating from a power line after being launched by the signal surface wave launcher in an RF signal transmission and reception apparatus according to the present invention.

The electromagnetic energy that propagates from the power line 20 includes energy radiated into free space by the signal surface wave launcher 5 that is not coupled into the wave signal 30, electromagnetic energy radiating from the wave signal 30 and scattering signals from the wave signal 30 at discontinuities or impediments in the power line, including sags, bends and isolators. The wave signal 30 is coupled to the power line 20 and launched by the signal surface wave launcher 5 further comprises a wave signal 30 that is transmitted along and radiates substantially perpendicular to the direction the wave signal 30 travels along the power line 20 and radiates in other directions due to sag in the power line 20 or where discontinuities are present in the power line 20, as shown in FIG. 3.

The energy transmitted from the signal surface wave launcher 5 is transferred into the Sommerfeld wave together with the generation of higher order modes (H.O.M.) at the launcher flared horn 13 that satisfy the boundary conditions. The H.O.M. represents a loss in the surface wave launching efficiency and radiate into space with a fall off in power density consistent with $1/r^2$. The energy from the launcher that coupled into the Sommerfeld wave propagates down the power line 20 at close to the speed of light with only small losses in surface wave power from ohmic loss and radiation loss. The power density of the radiated wave signal 30 perpendicular to the power line 20 falls off at $1/r$ rather than $1/r^2$.

The wave signal 30 acts as a carrier signal for a modulated signal 31, such as an RF communications signal, that radiates from the wave signal 30. The modulated signal 31 is radiated in free space and can be received by appropriate receiving devices 35 with a distance of about 250 meters along the length of power line 20 in which the wave signal 30 is transmitted.

The wave signal 30 transmitted by the signal surface wave launcher 5 propagates along the power line and radiates substantially perpendicular to the power line via a Sommerfeld wave. In addition, the wave signal is scattered in various directions at discontinuities in the power line, such as discontinuities caused by transformers and insulators along the length of the power line. As distances of up to 250 meters, $1/r^2$ is the dominant signal loss.

In the signal surface wave transceiver 10, the data received from the command and control system 40 includes the data to be transmitted and the appropriate authorization to transmit the wave signal 30. In one embodiment, the RF communications link 15 transmits the data to be transmitted and the transmit command to another signal surface wave launcher 5 to circumvent a signal surface wave launcher 5 that has failed. In another embodiment, the RF communications link 15 transmits the data to be transmitted and the transmit command to another signal surface wave launcher 5 that is physically attached to an adjacent power line.

The RF communications link 15 can also receive free space radiated signals from appropriate transmitting devices in the vicinity of the power line 20 and transmit the received signals to the command and control 40 or other users in the vicinity of the power line 20 by either converting the received signal for transmission along the power line 20 via the signal surface wave launcher 5 or transmitting the received signal in free space using the RF communications link 15.

The type of wave signal 30 that can be transmitted by the signal surface wave launcher 5 along the power line can be a Sommerfeld wave.

The type of wave signal 30 that can also be transmitted by the signal surface wave launcher 5 along the power line can be a continuous wave (CW) signal, a linear frequency modulated continuous wave (LFMCW) signal, an ultra-wideband (UWB) signal or a modulated signal using one of pulse position modulation (PPM), binary phase-shift keying (BPSK), differential phase-shift keying (DPSK), quadrature phase-shift keying (QPSK), multiple phase-shift keying (MPSK), continuous-phase frequency-shift keying (CPFSK), minimum shift keying (MSK), Gaussian minimum shift keying (GMSK), stepped CW and coded waveforms.

The distance that the transmitted wave signal 30 can be received by a signal, surface wave transceiver from the transmitting signal surface wave launcher 5 along the power line 20 can be a function of type of transmitted waveform, transmitted power of the wave signal 30, diameter of the power line 20, sag and discontinuities in the power line 20. In some embodiments, the distance the transmitted wave signal 30 can be received by another signal surface wave transceiver is about 800 meters.

In one embodiment of the signal surface wave transceiver 10, a flared horn 13 is attached to one end of the surface wave transceiver housing 11 and a shorting disk is attached toward the other end of the surface wave transceiver housing 11. In this embodiment, the flared horn 13 couples the wave signal 30 onto the power line 20 in the direction of the flared horn and the shorting disk prevents the wave signal 30 from being launched in the opposing direction. In another embodiment, a flared horn 13 is attached to each of the opposing ends of the surface wave transceiver housing 11 without the shorting disk. In this embodiment, the flared horns 13 can couple the wave signal 30 in one direction or both directions along the power line 20, as shown in FIG. 1.

In some embodiments, the signal surface wave launcher 5 of the wide-area RF signal transmission and reception apparatus is inductively powered from the power line 20. In other embodiments, the signal surface wave launcher 5 includes a self contained power supply, such as a rechargeable battery and a small solar panel to recharge the rechargeable battery.

In one embodiment of the wide-area RF signal transmission and reception apparatus, a first signal surface wave transceiver 10 is paired with a second signal surface wave transceiver to form a transmit/receive pair. In some embodiments, a plurality of the transmit/receive pairs are installed along one power line to form the wide-area RF signal transmission and reception apparatus of a user selectable length. In other embodiments, a plurality of the transmit/receive pairs are installed along multiple power lines to form the wide-area RF signal transmission and reception apparatus of a user selectable length.

Figure 32:
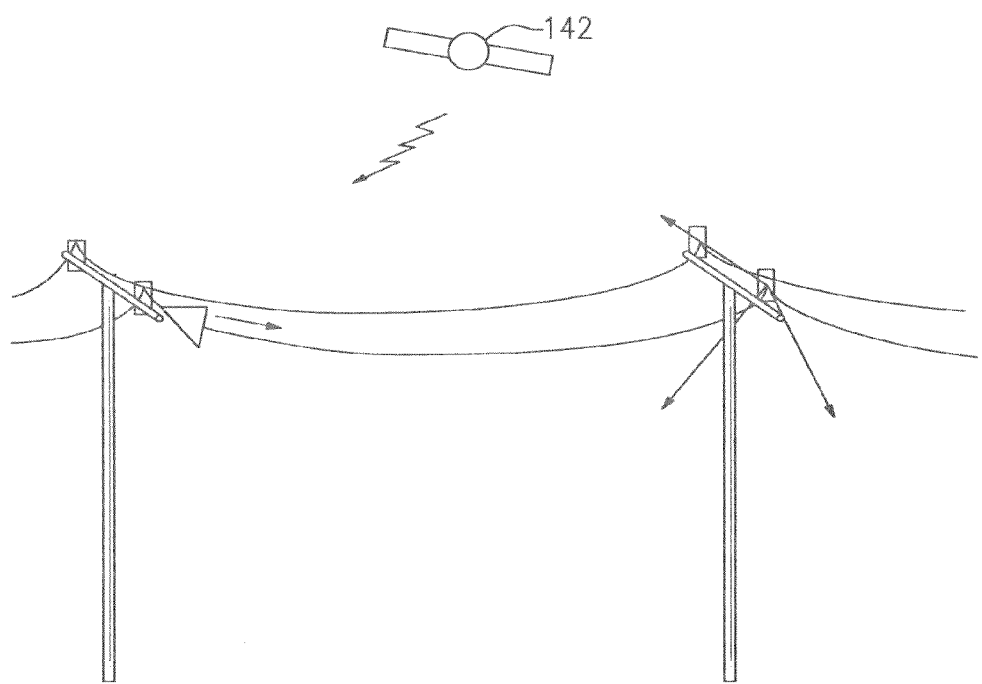
FIG. 32 is one example of a system-wide time reference for a bi-static conductive line radar according to the present invention.

In some embodiments, each of the transmit/receive pair operates within a predetermined time slot based on a system-wide time reference to avoid interference within the wide-area RF signal transmission and reception apparatus. In these embodiments, the system-wide time reference is GPS 142, as shown in FIG. 32, or a system interface unit designated reference source that is adjusted in each of the signal surface wave transceivers along the length of the one or more power lines forming the wide-area RF signal transmission and reception apparatus.

Figure 4:
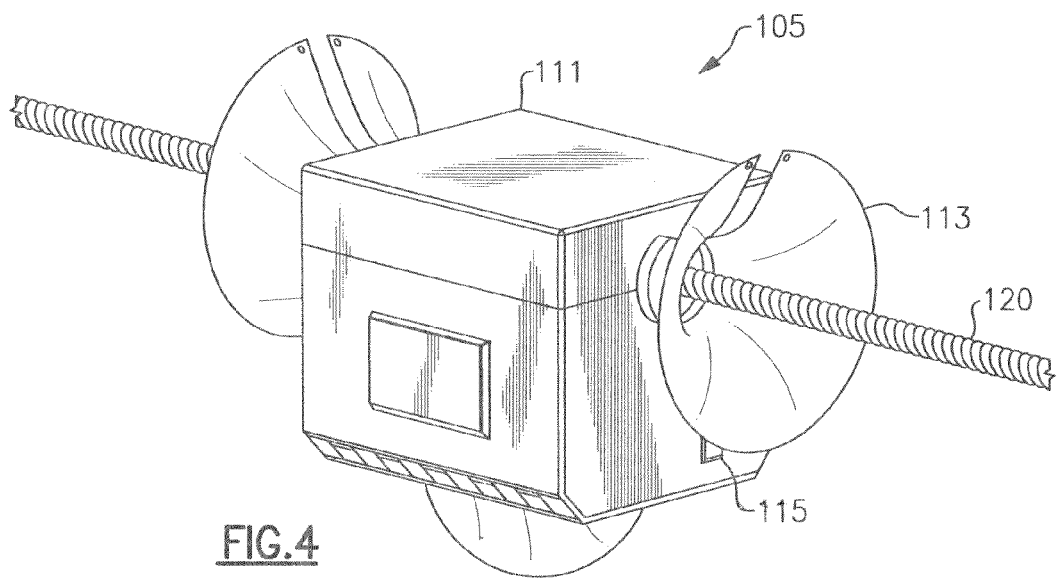
FIG. 4 is a drawing of an embodiment of a signal surface wave launcher in a mono-static radar system according to the present invention.
Figure 6:
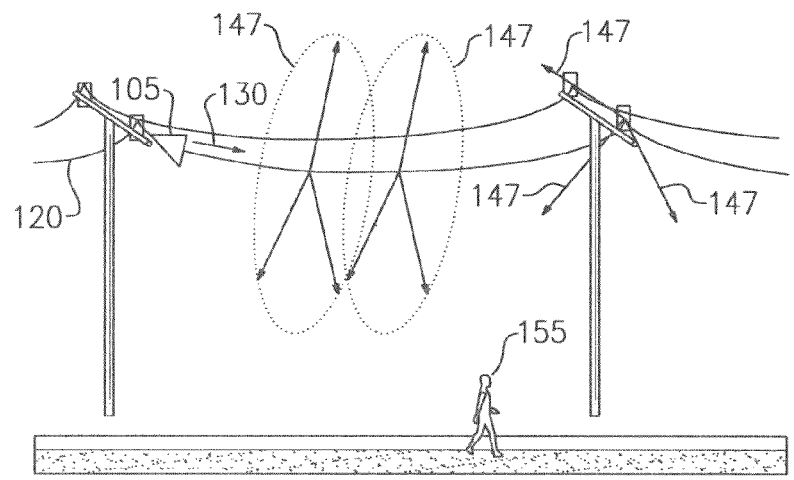
FIG. 6 depicts a wave signal traveling along and radiating from a power line after being launched by the signal surface wave launcher in a mono-static radar system according to the present invention.
Figure 7:
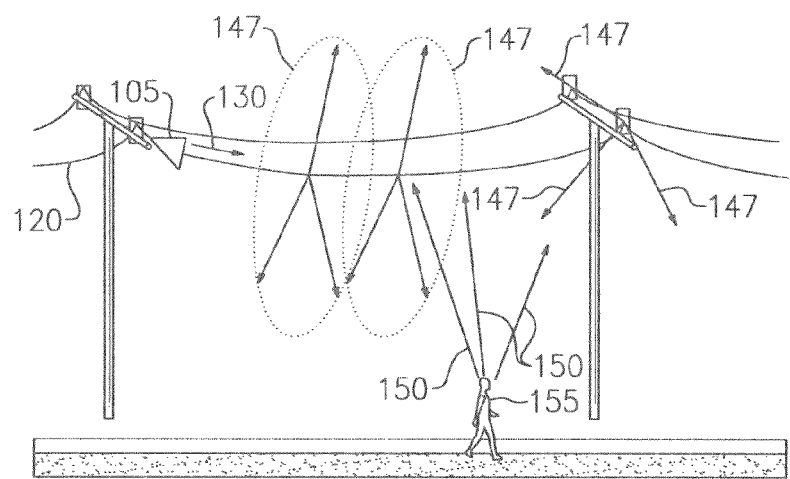
FIG. 7 depicts a wave signal traveling along and radiating from a power line after being launched by a signal surface wave launcher and receiving the reflected signal in a mono-static radar system according to the present invention.

FIG. 4 depicts an embodiment of a mono-static conductive line radar system that comprises a signal surface wave launcher 105. The signal surface wave launcher 105 comprises a signal surface wave transceiver 110, at least one RF communications link 115, and at least one signal processor 145, with the signal surface wave launcher 105 physically attached to a power line 120, as shown in FIG. 4. The signal surface wave transceiver 111 transmits a wave signal 130 along the power line 120, wherein a signal 131 radiates from the wave signal 130 in a plurality of directions from the power line 120, as shown in FIG. 6. The signal surface wave transceiver 110 receives reflected signals 150 from a target 155 from the signal 131 radiated in a plurality of directions from the power line 120 within a distance from the power line 120 along a length of the power line 120, and the at least one signal processor 117 physically located within the signal surface wave launcher 105 detects the target 155 from the reflected signals 150 received from at least one signal surface wave transceiver 110, as shown in FIG. 7.

The signal surface wave transceiver 110 of the signal surface wave launcher 105 comprises a surface wave transceiver housing 111, at least one metallic housing and an input connector that are housed within the surface wave transceiver housing 111, and at least one flared horn 113, which surrounds the power line 120, as shown in FIG. 4. The at least one signal processor 117 (not shown) and electronics for the at least one RF communication link 115 can be physically located within the interior of surface wave transceiver housing 111.

The surface wave transceiver housing 111 is attached to a portion of the power line 120 and is formed of a metallic or a non-metallic material. The surface wave transceiver housing 111 covers and protects the metallic housing and coaxial input connector from the external environment. The surface wave transceiver housing 111 is typically formed in a rectangular shape, but can be formed in virtually any shape that will cover the metallic housing and coaxial input connector. In some embodiments, the surface wave transceiver housing 111 further comprises a hardwired input connector, an infrared input connector and/or a light signal connector for receiving data and/or command and control signals.

Figure 5A:
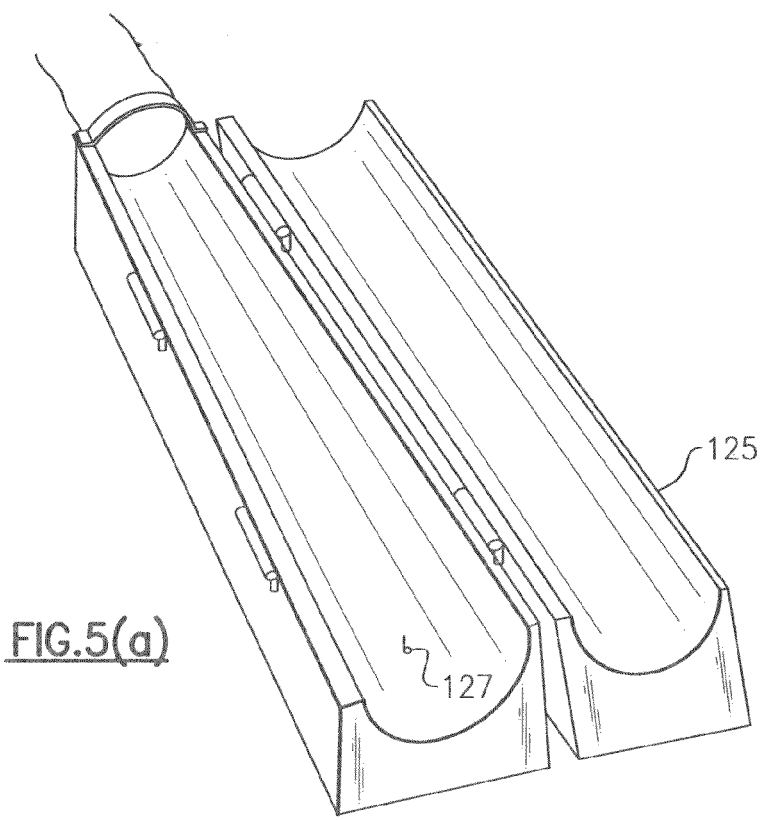
FIG. 5(a) is a drawing of an embodiment of a metallic housing of a signal surface wave launcher in a mono-static radar system according to the present invention.
Figure 5B:
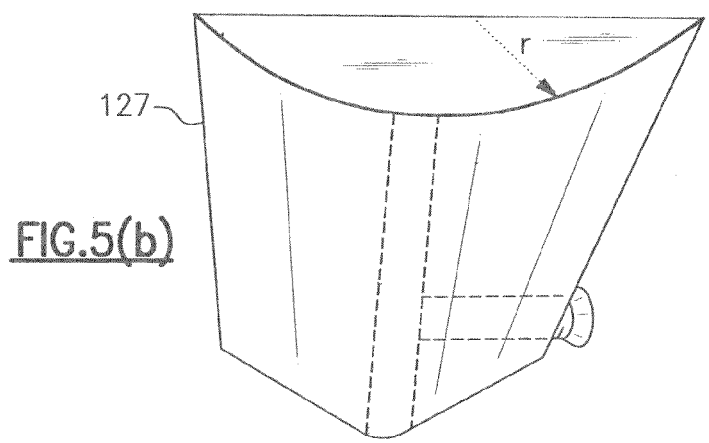
FIG. 5(b) is a drawing of an embodiment of a probe for connecting the coaxial connector of a signal surface wave launcher to the power line in a mono-static radar system according to the present invention.

The metallic housing 125 is formed to surround or enclose a portion of the power line 120. The metallic housing 125 can be formed in a tubular clamshell type configuration, as shown in FIG. 5(*a*). The metallic housing 125 can also have alternative shapes that can be secured within the surface wave transceiver housing 111 and enclose a portion of the power line 120 without damaging the power line 120.

The probe 127 can have a straight shape or a tapered shape, as shown in FIG. 5(*b*). The probe 127 physically interfaces and adapts the coaxial transmission cable to the power line to a coaxial transmission line mode to launch the wave signal on the power line 120 via flared horn 113.

The flared horn 113 is used to launch the wave signal 130, such as a transverse electromagnetic wave, along the power line 120. The flared horn 113 is formed in a way that can be installed over an existing power line 120, as shown in FIG. 4. The flared horn 113 also receives a wave signal 130 transmitted by another surface wave transceiver along the power line 120 and transfers the received wave signal to the one or more signal processors 117 contained within the surface wave transceiver housing 111.

The type of wave signal 130 that can be transmitted by the signal surface wave launcher 105 along the power line is sometimes referred to as a Sommerfeld wave.

The type of wave signal 130 that can be transmitted by the signal surface wave launcher 105 along the power line also include a continuous wave (CW) signal, a linear frequency modulated continuous wave (LFMCW) signal, an ultra-wideband (UWB) signal or a modulated signal using one of pulse position modulation (PPM), binary phase-shift keying (BPSK), differential phase-shift keying (DPSK), quadrature phase-shift keying (QPSK), multiple phase-shift keying (MPSK), continuous-phase frequency-shift keying (CPFSK), minimum shift keying (MSK), Gaussian minimum shift keying (GMSK). The modulated signal that is carried by the wave signal 130 acts as a radar signal 147.

The at least one signal processor 145 is physically located in the signal surface wave launcher 105, receives command and control signals via the RF communications link 115 and processes the command and control signals into a radar signal 147 that is transmitted with the wave signal 130. The flared horn 113 picks up reflected signals 150 from the radar signal 147, as well as reflected signals 150 from terrain, and pass the reflected signals 150 to the signal processor 145, which processes the reflected signals 150 to determine whether a target 155 is present within a detectable distance of the power line 120. When the signal processor 145 detects a target 155 within a detectable distance of the power line 120, the signal processor transmits the target detection to the command and control system 140 via the RF communications link 115.

The command and control system 140, as shown in FIG. 1A, can transmit instructions and data to one or more of the signal surface wave launchers 105 via the RF communications link 115, a hardwired communications link, such as a coaxial cable, an infrared link or light link that include instructions to transmit a wave signal 130 along the power line 120.

An embodiment of a method of detecting a target using a mono-static conductive line radar comprises transmitting a wave signal 130 along a power line 120 from the mono-static conductive line radar, the mono-static conductive line radar comprises a signal surface wave transceiver 110 physically attached to the power line 120, at least one RF communications link 115, and at least one signal processor 145, with the mono-static conductive line radar mounted on the power line 120, wherein a radar signal 147 radiates from the wave signal 130 in a plurality of directions from the power line 120, receiving reflected signals 150 from a target 155 within a distance from the power line 120 along a length of the power line 120 at the signal surface wave transceiver 110 from the radar signal 147 radiated in the plurality of directions from the power line 120, and detecting the target 155 from the reflected signals 150 received at the signal surface wave transceiver 111 when the target 155 is within a detectable distance from the power line 120.

The wave signal 130 is coupled to the power line 120 and launched by the signal surface wave launcher 105 further comprises a wave signal 130 that is transmitted along and radiates substantially perpendicular to the direction the wave signal 130 travels along the power line 120 and radiates in other directions due to sag in the power line 120 or where discontinuities are present in the power line 120, as shown in FIG. 6. The scattered energy from the wave signal 130 caused by discontinuities in the power line 120 transfers the scattered energy into free space where the energy density falls off at $1/r^2$.

The wave signal 130 acts as a carrier signal for a modulated signal, such as a radar signal 147, that radiates from the wave signal 130. The radar signal 147 is radiated in free space and will impinge upon surfaces and objects including targets 155 within a detectable distance of about 250 meters on the ground along the length of power line 120 in which the wave signal 130 is transmitted. In the mono-static conductive line radar system, the power line 120 acts as the antenna where the direction of the transmitted wave signal 30 can be multi-directional due to discontinuities, such as discontinuities caused by transformers and insulators along the length of the antenna (i.e., power line 120).

The wave signal 130 transmitted by the signal surface wave launcher 105 propagates along the power line 120 and radiates substantially perpendicular to the power line 120 via a Sommerfeld wave, as shown in FIG. 6. The field intensity along the surface is modified by energy reflected from the ground, vegetation, such as shrubs and trees, and buildings, which causes variations in field amplitude and depolarization of the incident wave.

The receiver of the signal surface wave transceiver 110 in the signal surface wave launcher 105 receives return signals from the radar signal 147 portion from terrain and objects within the detectable distance of the power line 120, and scattered return signals 150 from one or more targets 155 within the detectable distance, as shown in FIG. 7. At distances of up to 250 meters, $1/r^2$ is the dominant signal loss.

In the mono-static conductive line radar system, the terrain and objects within the detectable distance along the length of the power line 120 are determined by the mono-static conductive line radar system during installation. By determining the background objects and terrain within the detectable distance from the power line 120 and normalizing the data, thereby providing a good adaptive clutter map of the area in the vicinity of the power line 130, removing Doppler caused by at least one of wind movement and vibration of the power line; and using Doppler processing to determine relative movement of objects within a detectable distance, the monostatic conductive line radar system can identify any new objects, especially moving objects, such as one or more targets 155 that is within the detectable distance. The background terrain and objects can be adapted to account for physical changes, such as tree and shrubbery growth over time.

A target 155 entering an area of surveillance, which is defined as an area within a specified distance from the power line 120 along the length of the power line 120, is detected from an increase in at least one of a change in signal Doppler and a change in signal amplitude from reflected signals 150 from the target 155 received by the signal surface wave transceiver 110. The distance at which the target 155 is detected can be a function of a type of transmitted waveform, transmitted power of the wave signal 130, diameter and physical configuration of the power line 120 and at least one of radar cross section of the target 155, speed of the target 155, number of bright points and physical size of the target 155. In some embodiments, the distance the target 155 can be detected on the ground is within about 250 meters of the power line 120 along the length of the power line 120. In some of these embodiments, the distance the target 155 can be detected in low airspace within about 1000 meters of the power line 120 along the length of the power line 120.

In the mono-static conductive line radar system of the present invention, an RF communications link 115 is established for transmitting an RF signal through free space that is not the signal used as the radar signal 147. The RF signal is received by an adjacent signal surface wave transceiver that is separated from the signal surface wave transceiver 110 by a distance that can be a function of at least one of the transmitted power of the RF signal, the frequency of the RF signal, the terrain and density of the vegetation in the area near the power line. In some embodiments, the distance at which the RF signal can be received by another signal surface wave transceiver is limited by line-of-sight (LOS). In other embodiments, the distance can be a function of a link budget for the command and control system 140.

In some embodiments, the signal surface wave launcher 105 of the mono-static conductive line radar system is inductively powered from the power line 120. In other embodiments, the signal surface wave launcher 105 includes a self contained power supply, such as a rechargeable battery and a small solar panel to recharge the rechargeable battery.

In some embodiments, the mono-static conductive line radar system further comprises an accelerometer to measure at least one of wind movement and vibration of the power line 120, and the at least one signal processor 145 removes effects of Doppler resulting from the at least one of wind movement and vibration of the power line 120 measured by the accelerometer from signals received at the signal surface wave transceiver 110. In some of these embodiments, the accelerometer is a MEMS accelerometer.

In some embodiments of the mono-static conductive line radar system, the at least one signal processor 145 estimates the size of the target 155 from the reflected signals 150 received from the target 155 at the signal surface wave transceiver 110. In other embodiments, the at least one signal processor 145 estimates the distance between the target 155 and the power line 120 from the reflected signals 150 received from the target 155. In other embodiments, the at least one signal processor 145 estimates the speed of the target 155 from the reflected signals 150 received from the target 155.

In some embodiments, the at least one RF communications link 115 is an RF communications transceiver with integrated antenna. The RF communications link 115 receives control signals from the command and control system 140 and transmits target detections to the command and control system when the target is detected. In some of these embodiments, the RF communications link 115 transmits the control signals to an adjacent signal surface wave launcher to circumvent at least one physical break in the power line. In other embodiments, the RF communications link 115 transmits the control signals to an adjacent signal surface wave launcher to bypass a failed RF communications transceiver. In other embodiments, the RF communications link 115 transmits control signals to an adjacent signal surface wave launcher that is physically attached to a second power line that is not in direct physical contact with the power line.

Figure 8:
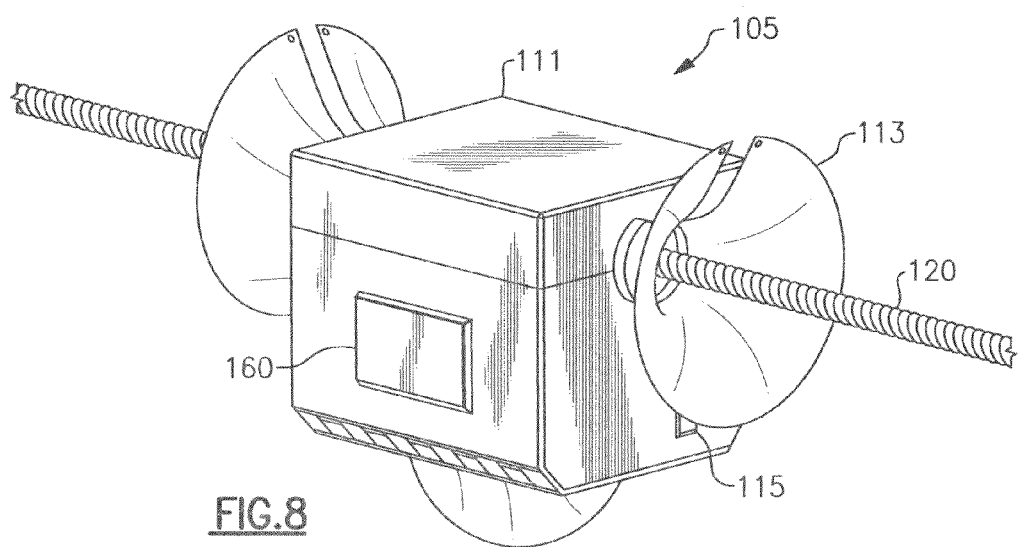
FIG. 8 is a drawing of an embodiment of a signal surface wave launcher with an acoustic sensor in a mono-static radar system according to the present invention.
Figure 9:
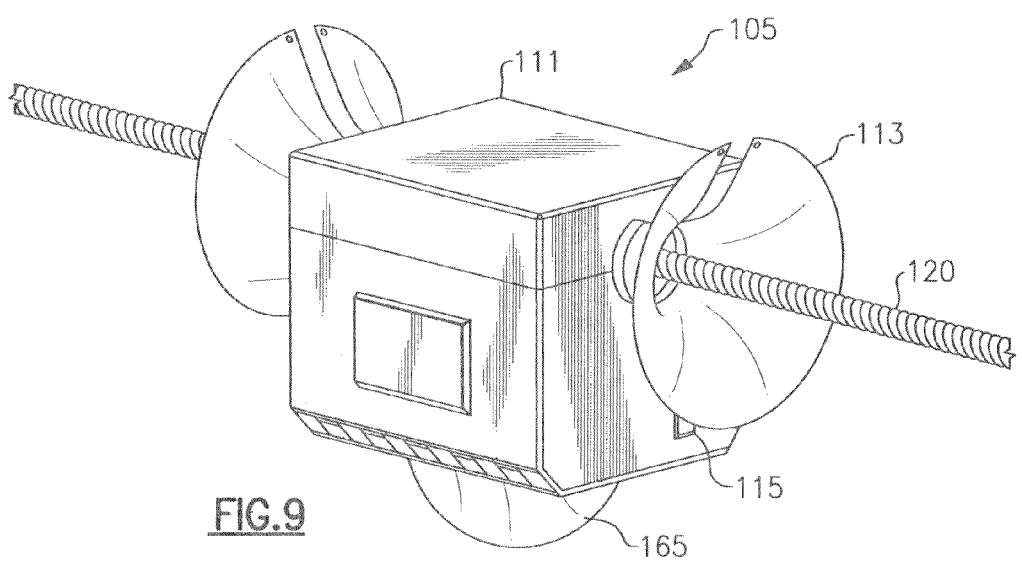
FIG. 9 is a drawing of an embodiment of a signal surface wave launcher with an infrared (IR) sensor in a mono-static radar system according to the present invention.

In some of these embodiments, the mono-static conductive line radar system further comprises an acoustic sensor 160, which is co-located with the mono-static conductive line radar, to confirm the mono-static conductive line radar system detection of the target 155 from the reflected signals 150, as shown in FIG. 8. In other embodiments, the mono-static conductive line radar system further comprises an infrared (IR) sensor 65, which is co-located with the mono-static conductive line radar, to confirm the mono-static conductive line radar system detection of the target from the reflected signals, as shown in FIG. 9.

Figure 10:
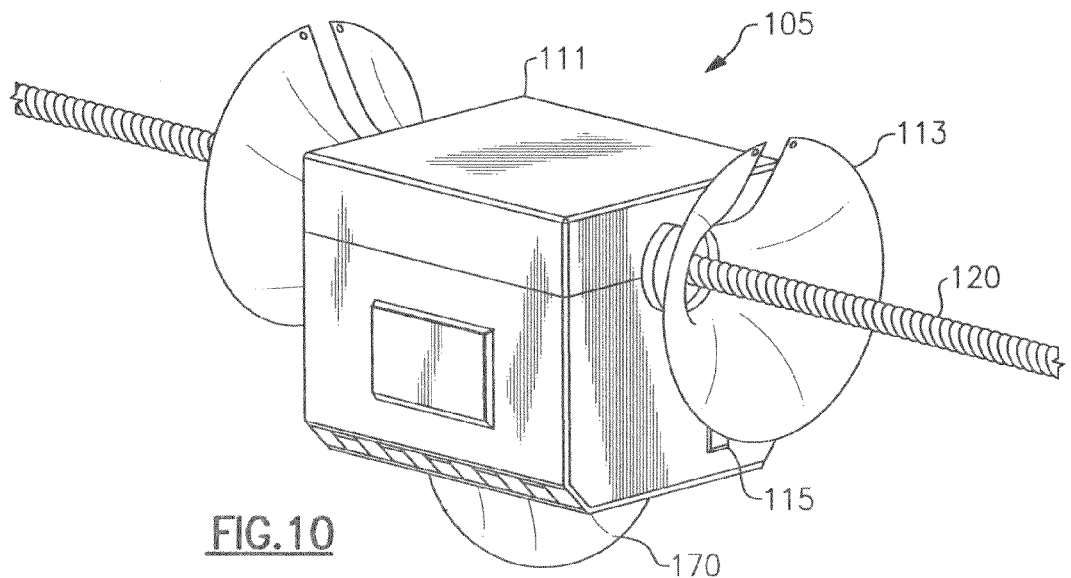
FIG. 10 is a drawing of an embodiment of a signal surface wave launcher with a video sensor in a mono-static radar system according to the present invention.
Figure 11:
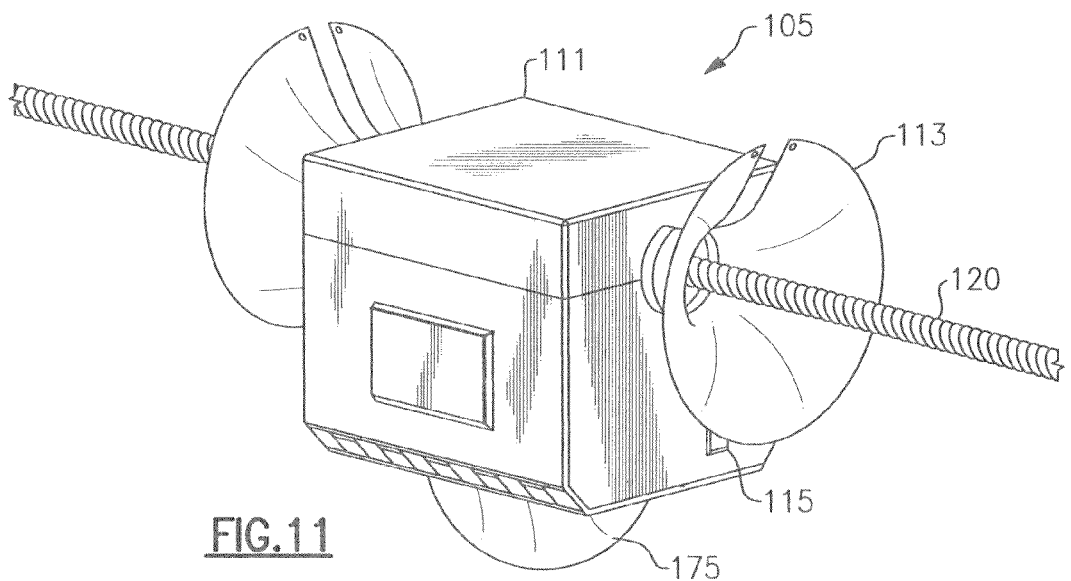
FIG. 11 is a drawing of an embodiment of a signal surface wave launcher with an ultra-sonic sensor in a mono-static radar system according to the present invention.

In other embodiments, the mono-static conductive line radar system further comprises a video sensor 170, which is co-located with the mono-static conductive line radar, to confirm the mono-static conductive line radar system detection of the target from the reflected signals, as shown in FIG. 10. In other embodiments, the mono-static conductive line radar system further comprises an ultra-sonic sensor 175, which is co-located with the mono-static conductive line radars, to confirm the mono-static conductive line radar system detection of the target from the reflected signals, as shown in FIG. 11.

In some embodiments of the present invention, a plurality of the mono-static conductive line radars are installed along at least the power line to form the mono-static conductive line radar system of a user selectable length. In some of these embodiments, each of the plurality of the mono-static conductive line radars operates within a predetermined time slot based on a system-wide time reference, to avoid interference within the mono-static conductive line radar system. In these embodiments, the system-wide time reference is GPS 142, as shown in FIG. 32, or a system interface unit designated reference source that is adjusted in each of the signal surface wave transceivers 110 along the length of the one or more power lines 120 forming the mono-static conductive line radar system.

In some embodiments, the signal processor 145 of the mono-static conductive line radar system estimates the size of the target 155 in the signal processor 145 from the reflected signals 150 received from the target 155. In other embodiments, the signal processor 145 estimates the distance between the target 155 and the power line 120 in the signal processor 145 from the reflected signals 150 received from the target 155. In other embodiments, the signal processor 145 estimates the speed of the target 155 in the signal processor 145 from the reflected signals 150 received from the target 155. In other embodiments, the signal processor 145 can estimate more than one of the size of the target 155, the speed of the target 155 and the distance between the target 155 and the power line 120.

In some embodiments, the method further comprises measuring at least one of wind movement and vibration of the power line 120 with an accelerometer, then calculating the effects of Doppler resulting from the at least one of wind movement and vibration of the power line 120 and removing the effects of Doppler in the signal processor 145 from the reflected signals 150 received from the target 155 at the signal surface wave transceiver 110.

In some embodiments, the method further comprises estimating the size of the target 155 in the signal processor 145 from the reflected signals 150 received from the target 155. In other embodiments, the method further comprises estimating the distance between the target 155 and the power line, 120 in the signal processor 145 from the reflected signals 150 received from the target 155.

In other embodiments, the method further comprises estimating the speed of the target 155 in the signal processor 145 from the reflected signals 150 received from the target 155. The method can also comprise estimating more than one of the size of the target 155, the speed of the target 155 and the distance between the target 155 and the power line 120.

In some embodiments, the method further comprises receiving control signals from a command and control system 140 at the signal surface wave launcher 105 using at least one RF communications link 115. In other embodiments, the method further comprises transmitting and receiving control signals between the surface wave launcher 105 and an adjacent signal surface wave launcher using the at least one RF communications link 115, such as a communications transceiver with integrated antenna.

In some embodiments, the method further comprises confirming the detection of the target 155 from the reflected signals 150 using an acoustic sensor 160 that is co-located with at least one signal surface wave transceiver 110 in the mono-static conductive line radar. In other embodiments, the method further comprises confirming the detection of the target 155 from the reflected signals 150 using an infrared (IR) sensor 165 that is co-located with at least one signal surface wave transceiver 110 in the mono-static conductive line radar. In some embodiments, the method further comprises confirming the detection of the target 155 from the reflected signals 150 using a video sensor 170 that is, co-located with at least one signal surface wave transceiver 110 in the mono-static conductive line radar. In some embodiments, the method further comprises confirming the detection of the target 155 from the reflected signals 150 using an ultra-sonic sensor 175 that is co-located with at least one signal surface wave transceiver 110 in the mono-static conductive line radar.

In some embodiments, the method further comprises monitoring a status of the signal surface wave launcher 105 using the at least one RF communications link 115, such as an RF communications transceiver with integrated antenna. In other embodiments, the method further comprises setting up the signal surface wave launcher 105 for transmission using the RF communications link 115.

Figure 12:
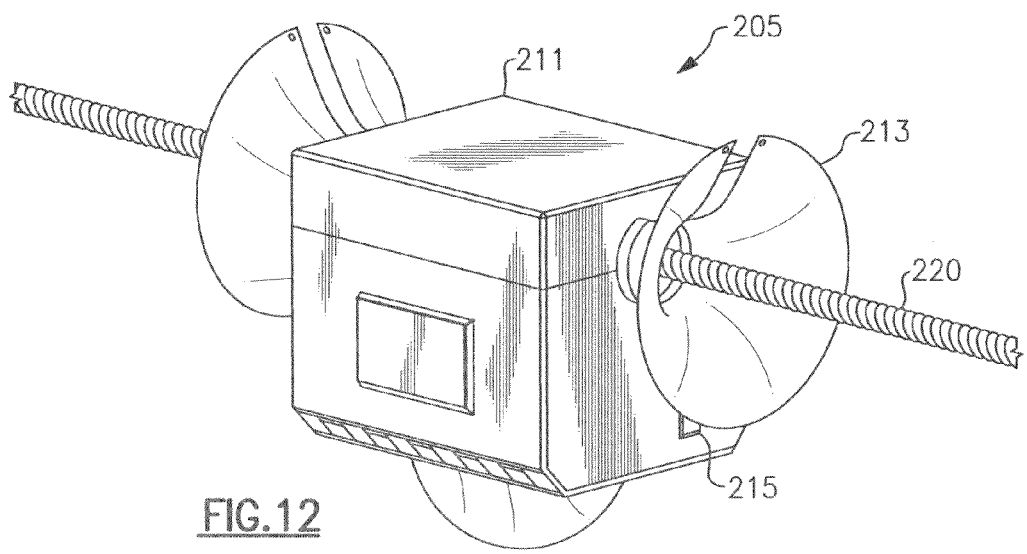
FIG. 12 is a drawing of an embodiment of a signal surface wave launcher in a bi-static radar system according to the present invention.
Figure 13:
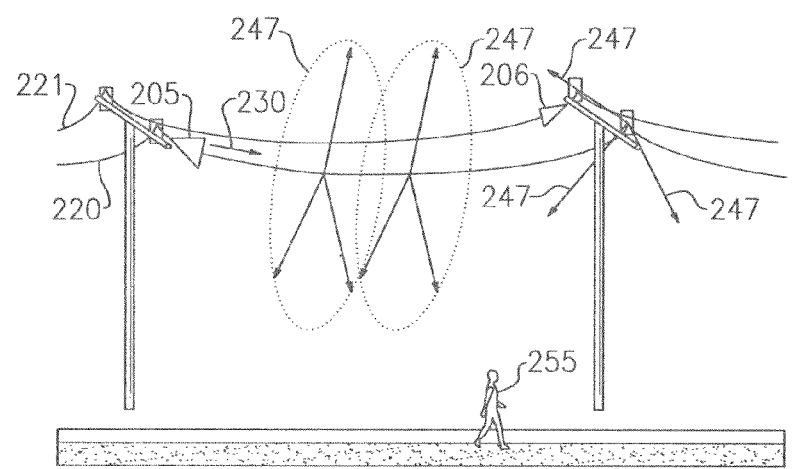
FIG. 13 depicts a wave signal traveling along and radiating from a power line after being launched by the signal surface wave launcher in a bi-static radar system according to the present invention.
Figure 15:
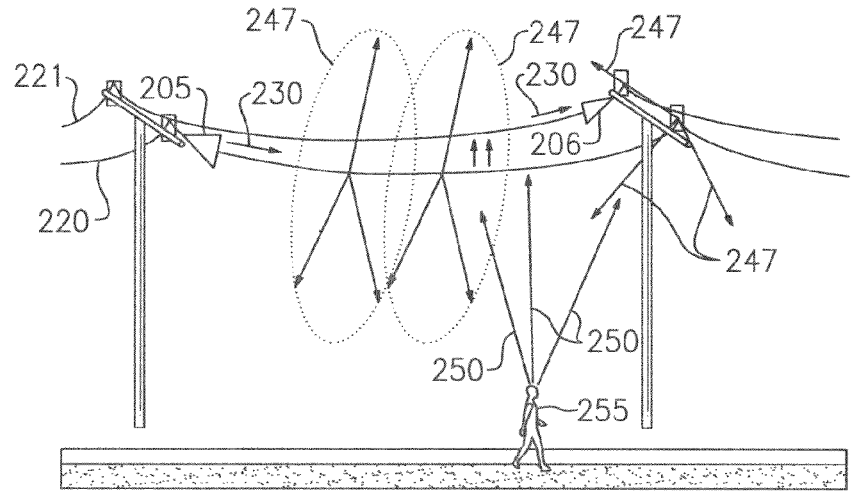
FIG. 15 depicts a wave signal traveling along and radiating from a power line after being launched by a signal surface wave launcher and receiving the reflected signal in a bi-static radar system according to the present invention.

FIG. 12 depicts an embodiment of a bi-static conductive line radar system that comprises at least one bi-static conductive line radar comprising a first signal surface wave launcher 205 physically attached to a first power line 220. The first signal surface wave transceiver transmits a wave signal 230 along the first power line 220, and a second signal surface wave launcher 206 physically attached to a second power line 221 receives the wave signal 230 transmitted by the first signal surface wave transceiver, the second power line 221 being substantially parallel to the first power line 220, as shown in FIG. 13. The first signal surface wave launcher 205 comprises a first signal surface wave transceiver, at least a first RF communications link 215, such as an RF transceiver with integrated antenna; and at least a first signal processor that can be physically located within first signal surface wave launcher 205, and the second signal surface wave launcher 206 comprises a second signal surface wave transceiver, at least a second RF communications link 216, such as an RF transceiver with integrated antenna; and at least a second signal processor that can be physically located within second signal surface wave launcher 206. The second signal surface wave launcher 206 is separated from the first signal surface wave launcher 205 by a distance, and a modulated signal, such as radar signal 247, radiates from the wave signal 230 in a plurality of directions from the first power line 220 as shown in FIG. 13. At least one of the first signal surface wave transceiver and the second signal surface wave transceiver receives reflected signals 250 from at least one target 255 from the radar signal 247 radiated in a plurality of directions from the first power line 220 within a distance from the first power line 220 along a length of the first power line 220, and at least one of the first signal processor and the second signal processor detects the at least one target 255 from the reflected signals 250 received by at least one of the first signal surface wave transceiver and the second signal surface wave transceiver, as shown in FIG. 15.

The signal surface wave transceiver of the signal surface wave launcher 205 comprises a surface wave transceiver housing 211, at least one metallic housing and an input connector that are housed within the surface wave transceiver housing 211, and at least one flared horn 213, which surrounds the power line 220, as shown in FIG. 12. The at least one signal processor and electronics for the at least one RF communication link 215 can be physically located within the interior of surface wave transceiver housing 211.

The surface wave transceiver housing 211 is attached to a portion of the power line 220 and is formed of a metal or a non-metallic material. The surface wave transceiver housing 211 covers and protects the metallic housing and coaxial input connector from the external environment. The surface wave transceiver housing 211 is typically formed in a rectangular shape, but can be formed in virtually any shape that will cover the metallic housing and coaxial input connector. In some embodiments, the surface wave transceiver housing 211 further comprises a hardwired input connector, an infrared input connector and/or a light signal connector for receiving data and/or command and control signals.

Figure 14A:
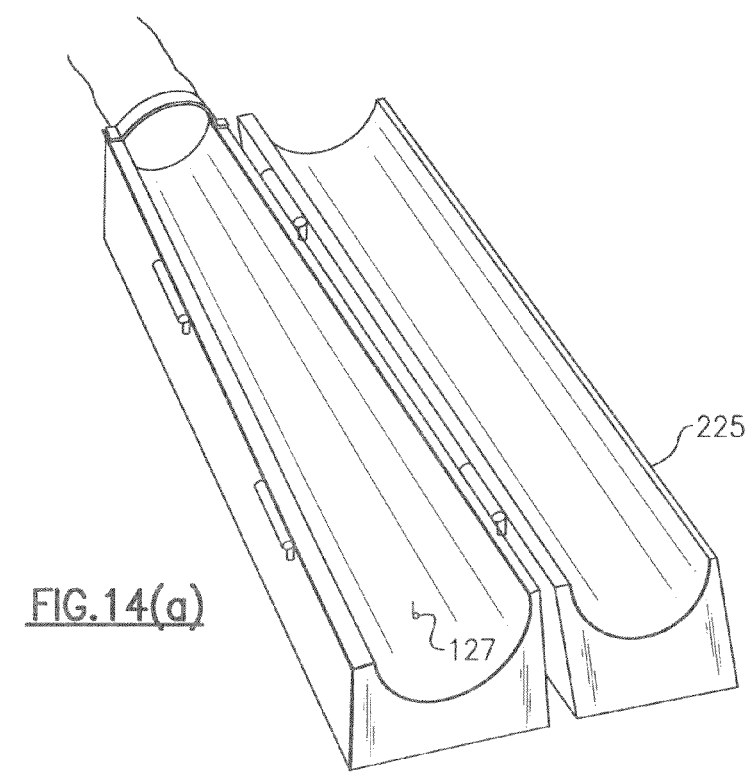
FIG. 14(a) is a drawing of an embodiment of a metallic housing of a signal surface wave launcher in a bi-static radar system according to the present invention.
Figure 14B:
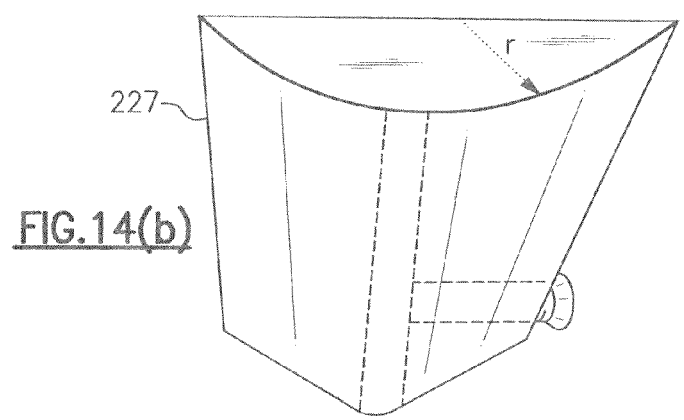
FIG. 14(b) is a drawing of an embodiment of a probe for connecting the coaxial connector of a signal surface wave launcher to the power line in a bi-static radar system according to the present invention.

The metallic housing 225 is formed to surround or enclose a portion of the power line 220. The metallic housing 225 can be formed in a tubular clamshell type configuration, as shown in FIG. 14(*a*). The metallic housing 225 can also have alternative shapes that can be secured within the surface wave transceiver housing 211 and enclose a portion of the power line 220 without damaging the power line 220.

The probe 227 can have a straight shape or a tapered shape, as shown in FIG. 14(*b*). The probe 227 physically interfaces and adapts the coaxial transmission cable to the power line to a coaxial transmission line mode to launch the wave signal on the power line 220 via flared horn 213.

The flared horn 213 is used to launch the wave signal 230, such as a transverse electromagnetic wave, along the power line 220. The flared horn 213 is formed in a way that can be installed over an existing power line 220, as shown in FIG. 11. The flared horn 213 also receives a wave signal 230 transmitted by another surface wave transceiver along the power line 220 and transfers the received wave signal to the one or more signal processors contained within the surface wave transceiver housing 211. In some embodiments, one or more of the first signal surface wave transceivers and the second signal surface wave transceivers comprise a transceiver facing in a first direction and another transceiver facing in a second direction.

The type of wave signals 230 that can be transmitted by the signal surface wave launcher 205 along the power line is sometimes referred to as a Sommerfeld wave.

The type of wave signals 230 that can be transmitted by the signal surface wave launcher 205 along the power line also include a continuous wave (CW) signal, a linear frequency modulated continuous wave (LFMCW) signal, an ultra-wideband (UWB) signal or a modulated signal using one of pulse position modulation (PPM), binary phase-shift keying (BPSK), differential phase-shift keying (DPSK), quadrature phase-shift keying (QPSK), multiple phase-shift keying (MPSK), continuous-phase frequency-shift keying (CPFSK), minimum shift keying (MSK), Gaussian minimum shift keying (GMSK), stepped CW and coded waveforms.

At least one of the signal processors 245 in the first and second signal surface wave launchers 205 receives command and control signals via the RF communications link 215 and processes the command and control signals into a radar signal 247 that is transmitted with the wave signal 230. The flared horns 213 of at least one of the first and second signal surface wave launchers 205 pick up reflected signals 250 from the radar signal 247, as well as reflected signals from terrain, and pass the reflected signals 250 to at least one of the signal processors 245 in the first and second signal surface wave launchers 205, which processes the reflected signals 250 to determine whether a target 255 is present within a detectable distance of the power line 220. The at least one signal processor 245 also receives wave signals 230 carrying the radar signal 247 that were transmitted from another signal surface wave launcher 205 and can re-transmit the received wave signal 230 and carried radar signal 247 to another signal surface wave launcher 205 using the flared horn 213 on the opposite end of the surface wave transceiver housing 211 from the flared horn 213 receiving the wave signal 230 carrying the radar signal 247. When the at least one signal processor 245 detects a target 255 within a detectable distance of the power line 220, the at least one signal processor 245 transmits the target detection to the command and control system via the RF communications link 215.

The command and control system can transmit instructions and data to one or more of the signal surface wave launchers 205 via the RF communications link 215, a hardwired communications link, such as a coaxial cable, an infrared link or light link that include instructions to transmit a wave signal 230 along the power line 220.

Further, a method of detecting a target using a bi-static conductive line radar is provided, the method comprises transmitting a wave signal 230 along a first power line 220 using a first signal surface wave launcher 205, the first signal surface wave launcher 205 being mounted on the first power line 220, wherein a radar signal 247 radiates from the wave signal 230 in a plurality of directions from the first power line 220 along a length of the first power line 220, receiving reflected signals 250 from at least one target 255 within a detectable distance from the first power line 220 by least at one of the first signal surface wave launcher and a second signal surface wave launcher from the radar signal 247 radiated in the plurality of directions from the first power line 220, and detecting the at least one target 255 from the reflected signals 250 received by at least one of the first signal surface wave transceiver and the second signal surface wave transceiver, as shown in FIG. 15. The first signal surface wave launcher 205 comprises a first signal surface wave transceiver, at least a first RF communications link 215, such as an RF transceiver with integrated antenna, and at least a first signal processor and the second signal surface wave launcher 206 comprises a second signal surface wave transceiver, at least a second RF communications link 216, such as an RF transceiver with integrated antenna, and at least a second signal processor, with the second signal surface wave launcher 206 being mounted on a second power line 221 and separated from the first signal surface wave transceiver by a distance.

In the bi-static conductive line radar, the wave signal 230 is launched by the first signal surface wave launcher 205, is coupled to the first power line 220 and radiates substantially perpendicular to the first power line 220 along the direction of travel of the wave signal 230 along the first power line 220, as shown in FIG. 13. The wave signal also radiates in other directions due to sag in the first power line 220 or where discontinuities are present in the first power line 220, as shown in FIG. 13. The wave signal 230 acts as a carrier signal for a radar signal 247 that radiates from the wave signal 230. The radar signal 247 is radiated in free space and will impinge upon surfaces and objects including targets 255 within a detectable distance of about 250 meters on the ground along the length of power line 220 in which the wave signal 230 is transmitted, as shown in FIG. 15.

In the bi-static conductive line radar system, the power line 220 acts as the antenna with the direction of the transmitted wave signal 230 can be multi-directional due to discontinuities in the first power line 220, such as discontinuities caused by transformers and insulators along the length of the antenna (i.e., power line 220). The radar signal 247 is radiated in free space and will impinge upon surfaces and objects including targets 255 within a detectable distance of about 250 meters on the ground along the length of power line 220 in which the wave signal 230 is transmitted.

The transmitted wave signal 230 and radar signal 247 are coupled from the first power line 220 to at least a substantially parallel second power line 221 including at least a second signal surface wave transceiver that is part of a second surface wave launcher 206 receiving the transmitted wave signal 230. The first signal surface wave transceiver and the second signal surface wave transceiver also receive perpendicular return signals from the Sommerfeld wave portion of the transmitted signal and scattered return signals from one or more targets 255.

The wave signal 230 transmitted by the signal surface wave launcher 205 propagates along the first power line 220 and radiates radially and substantially perpendicular to the first power line 220 via a Sommerfeld wave, as shown in FIG. 12. The receiver of the signal surface wave transceiver receives some of the radar signals from the Sommerfeld wave portion of the transmitted radar signal 247, reflected signals 250 from background objects and terrain in the vicinity of the power line and scattered reflected signals 250 from one or more targets 255. At distances of up to 250 meters, $1/r^2$ is the dominant signal loss.

In the bi-static conductive line radar system, the terrain and objects within the detectable distance along the length of the power line are determined by the bi-static conductive line radar system during installation. By mapping the background objects and terrain within the detectable distance from the power line 220 and normalizing the data, thereby providing a good adaptive clutter map of the area in the vicinity of the power line, removing Doppler caused by at least one of wind movement and vibration of the power line, and using Doppler processing to determine relative movement of objects within a detectable distance, the bi-static conductive line radar system can readily identify new objects and especially moving objects, such as one or more targets 255 that are within the detectable distance. The background terrain and objects can be adapted to account for physical changes, such as tree and shrubbery growth over time.

A target 255 entering an area of surveillance, which is defined as an area within a specified distance from the power line 220 along the length of the power line 220, is detected from an increase in at least one of a change in signal Doppler and a change in signal amplitude from reflected signals 250 from the target 255 received by one of the signal surface wave transceivers.

Figure 16:
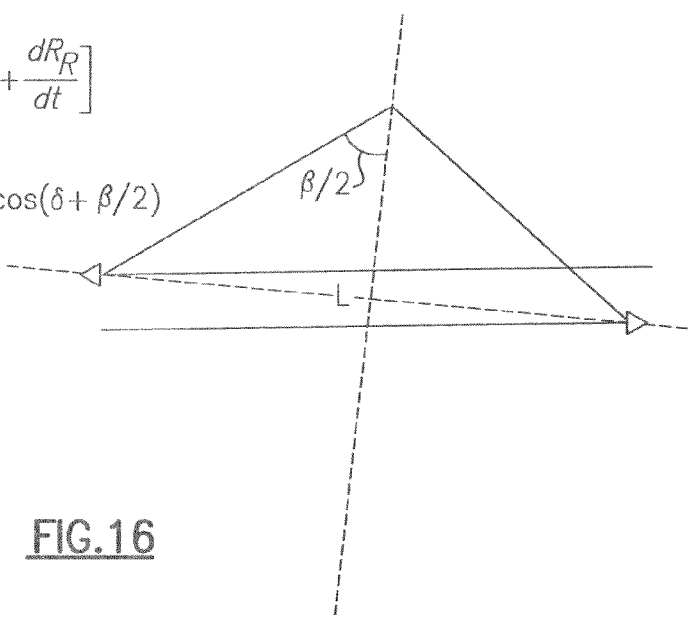
FIG. 16 is an example of equations for determining a target position using a bi-static radar system according to the present invention.

One embodiment of the bi-static radar of the present invention uses the equations shown in FIG. 16, to determine the location of a target that is positioned between the transmitter of one signal surface wave transceiver and the receiver of another signal surface wave transceiver. At least one of the first signal surface wave transceiver and the second signal surface wave transceiver receives the signal transmitted and reflected signals from the target 255 and detects the differences in modulation between the direct reception signal and the reflected signal.

Figure 17:
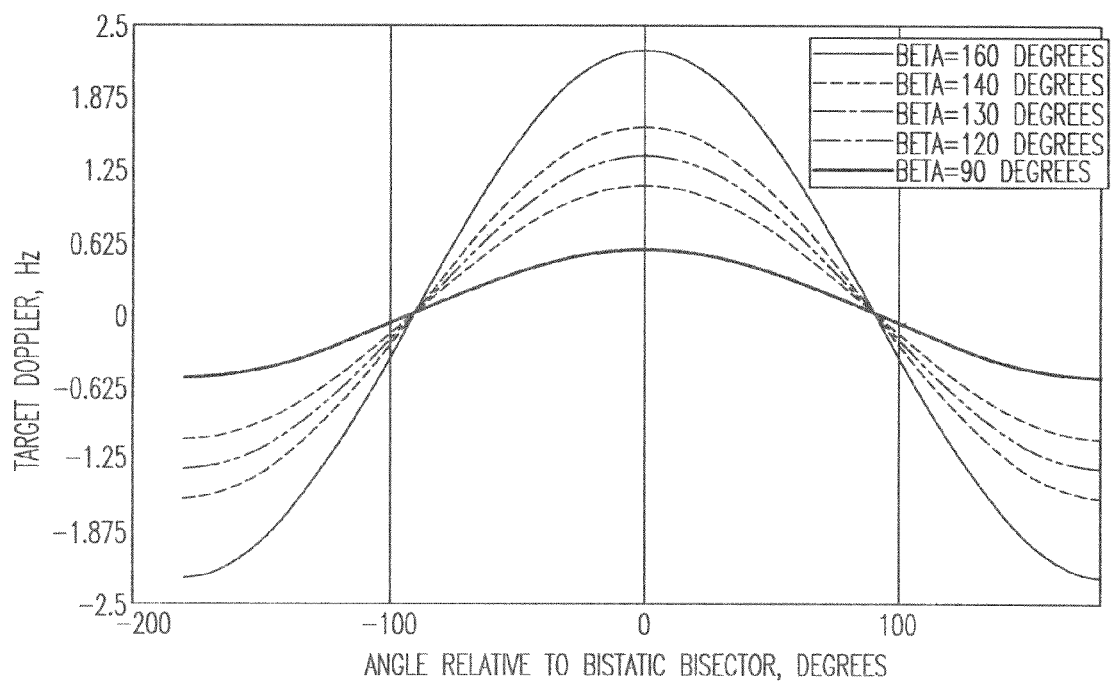
FIG. 17 is an example of an estimated Doppler of a target traveling at 3 mph. detected by a bi-static radar system according to the present invention.

The distance at which the target 255 is detected can be a function of a type of transmitted waveform, transmitted power of the wave signal 230, diameter and physical configuration of the power line 220 and at least one of radar cross section of the target 255, speed of the target 255, number of bright points and physical size of the target 255. For example, FIG. 17 provides an estimated Doppler of a target traveling at 3 mph. crossing the bi-static radar, shown in FIG. 15.

In some embodiments, the distance the target 255 can be detected on the ground is within about 250 meters of the power line 220 along the length of the power line 220. In some of these embodiments, the distance the target 255 can be detected in low airspace within about 1000 meters of the power line 220 along the length of the power line 220.

In the bi-static conductive line radar of the present invention, the reflected signals 250 from the one or more targets 255 comprises at least a first signal having an positive doppler component and at least a second signal having a negative doppler component when the target 255 is physically located within the operational range of the signal surface wave transceiver within the detectable distance along the length of the power line 220 and is moving substantially parallel to the power line.

In the bi-static conductive line radar system of the present invention, an RF communications link 215 is established for transmitting an RF signal through free space that is not the signal used as the radar signal 247. The RF signal is received by an adjacent signal surface wave transceiver that is separated from the signal surface wave transceiver by a distance that can be a function of at least one of the transmitted power of the RF signal, the frequency of the RF signal, the terrain and density of the vegetation in the area near the power line. In some embodiments, the distance at which the RF signal can be received by another signal surface wave transceiver is limited by line-of-sight (LOS). In other embodiments, the distance can be a function of a link budget for the command and control system.

In some embodiments, the first signal surface wave launcher 205 of the bi-static conductive line radar system is inductively powered from the first power line 220. In other embodiments, the first signal surface wave launcher 205 includes a self contained power supply, such as a rechargeable battery and a small solar panel to recharge the rechargeable battery.

In some embodiments, the bi-static conductive line radar system further comprises an accelerometer to measure at least one of wind movement and vibration of the first power line 220, and the at least one signal processor 245 removes effects of Doppler resulting from the at least one of wind movement and vibration of the first power line 220 measured by the accelerometer from reflected signals 250 received at the first signal surface wave transceiver and/or the second signal surface wave transceiver. In some of these embodiments, the accelerometer is a MEMS accelerometer.

In some embodiments of the bi-static conductive line radar system, the at least one signal processor 245 estimates the size of the target 255 from the reflected signals 250 received from the target 255 at the first signal surface wave transceiver and/or the second signal surface wave transceiver. In other embodiments, the at least one signal processor 245 estimates the distance between the target 255 and the power line 220 from the reflected signals 250 received from the target 255. In other embodiments, the at least one signal processor 245 estimates the speed of the target 255 from the reflected signals 250 received from the target 255.

Figure 34:
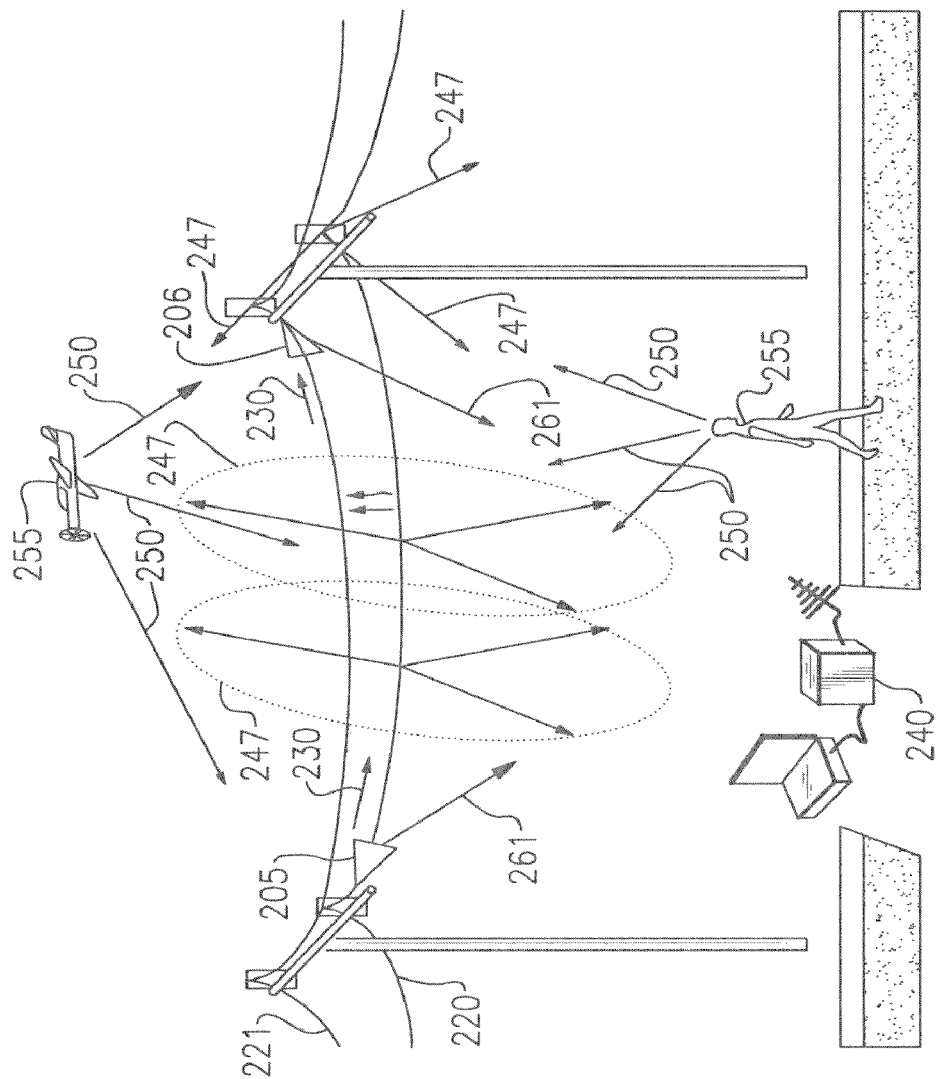
FIG. 34 depicts one embodiment of a bi-static conductive line radar according to the present invention transmitting received reflected signals to a command and control system.

In some embodiments, the first RF communications link 215 is an RF communications transceiver with integrated antenna. The first RF communications link 215 receives control signals from the command and control system 240 and transmits target detections to the command and control system when the target 255 is detected. In some of these embodiments, the first RF communications link 215 transmits the control signals to a second signal surface wave launcher 206 to circumvent at least one physical break in the first power line 220. In other embodiments, the RF communications link 215 transmits the control signals to a second signal surface wave launcher 206 to bypass a failed RF communications transceiver. In other embodiments, the RF communications link 215 transmits control signals to a second signal surface wave launcher 206 that is physically attached to a second power line 221 that is not in direct physical contact with the first power line 220. In one embodiment, one or more of the signal surface wave launchers 205 and 206 transmit received reflected signals via RF communications link 215 as RF signals 261 to the command and control system and the command and control system 240 detects target 255 within a detectable distance of the power line 220, as shown in FIG. 34. In another embodiment, one or more of the signal surface wave launchers 205 transmit data from the received reflected signals via RF communications link 215 to the command and control system and the command and control system detects target 255 within a detectable distance of the power line 220.

In some embodiments of the present invention, a plurality of the bi-static conductive line radars are installed along at least the first power line 220 to form the bi-static conductive line radar system of a user selectable length. In some of these embodiments, each of the plurality of the bi-static conductive line radars operates within a predetermined time slot based on a system-wide time reference to avoid interference within the bi-static conductive line radar system. In these embodiments, the system-wide time reference is GPS 142, as shown in FIG. 32, or a system interface unit designated reference source that is adjusted in each of the first signal surface wave transceivers and second signal surface wave transceivers along the length of the first power line and the second power line 221 forming the bi-static conductive line radar system.

Figure 18:
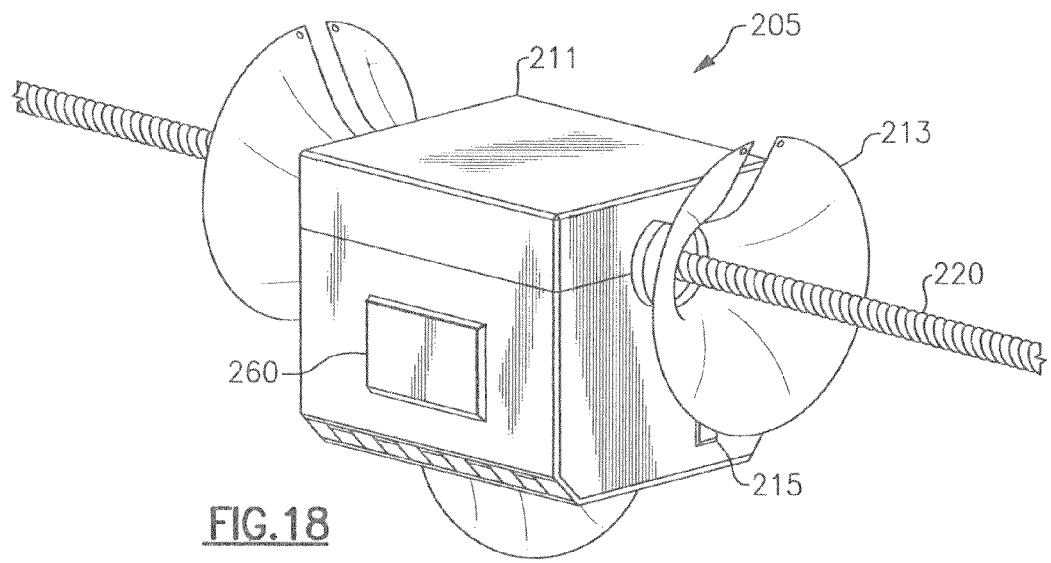
FIG. 18 is a drawing of an embodiment of a signal surface wave launcher with an acoustic sensor in a bi-static radar system according to the present invention.
Figure 19:
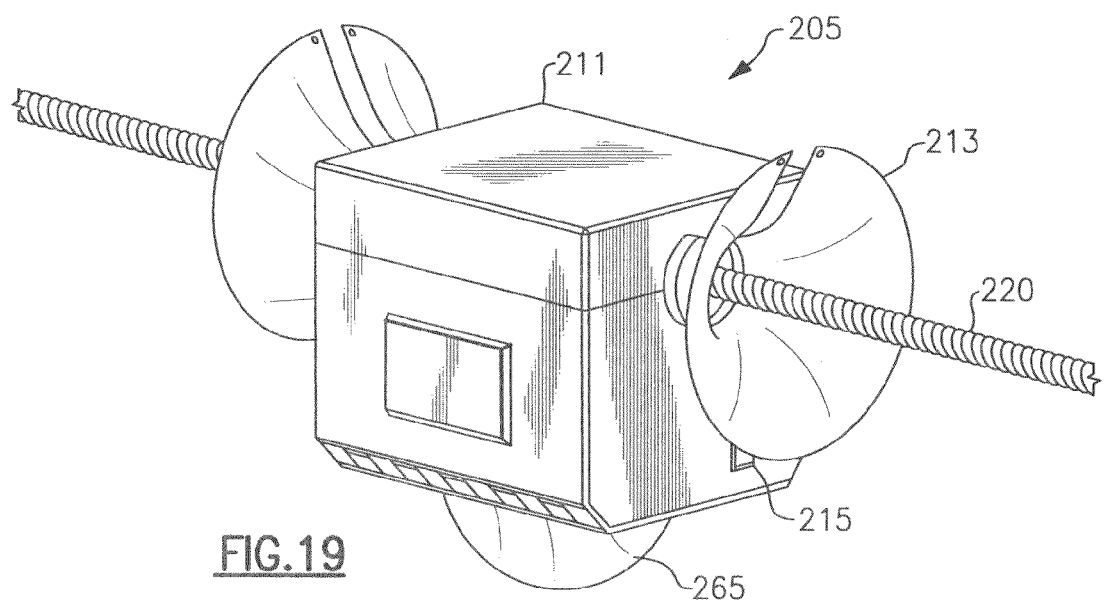
FIG. 19 is a drawing of an embodiment of a signal surface wave launcher with an infrared (IR) sensor in a bi-static radar system according to the present invention.

In some embodiments, the bi-static conductive line radar system further comprises an acoustic sensor 260, which is co-located with at least one of the plurality of the bi-static conductive line radars, to confirm the bi-static conductive line radar system detection of the target 255 from the reflected signals 250, as shown in FIG. 18. In other embodiments, the bi-static conductive line radar system further comprises an infrared (IR) sensor 265, which is co-located with at least one of the plurality of the bi-static conductive line radars, to confirm the bi-static conductive line radar system detection of the target 255 from the reflected signals 250, as shown in FIG. 19.

Figure 20:
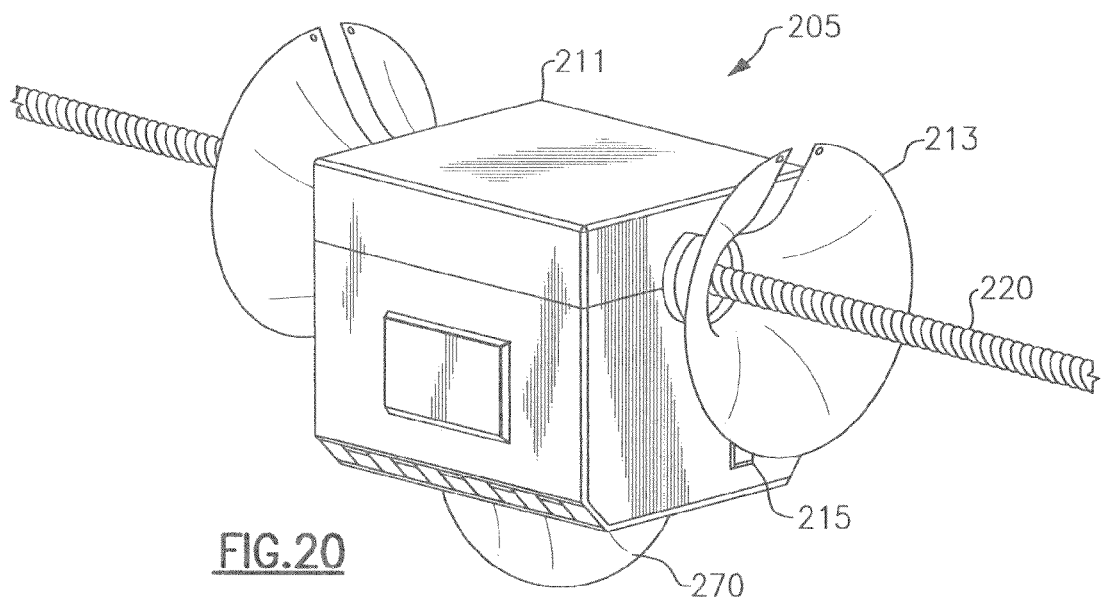
FIG. 20 is a drawing of an embodiment of a signal surface wave launcher with a video sensor in a bi-static radar system according to the present invention.
Figure 21:
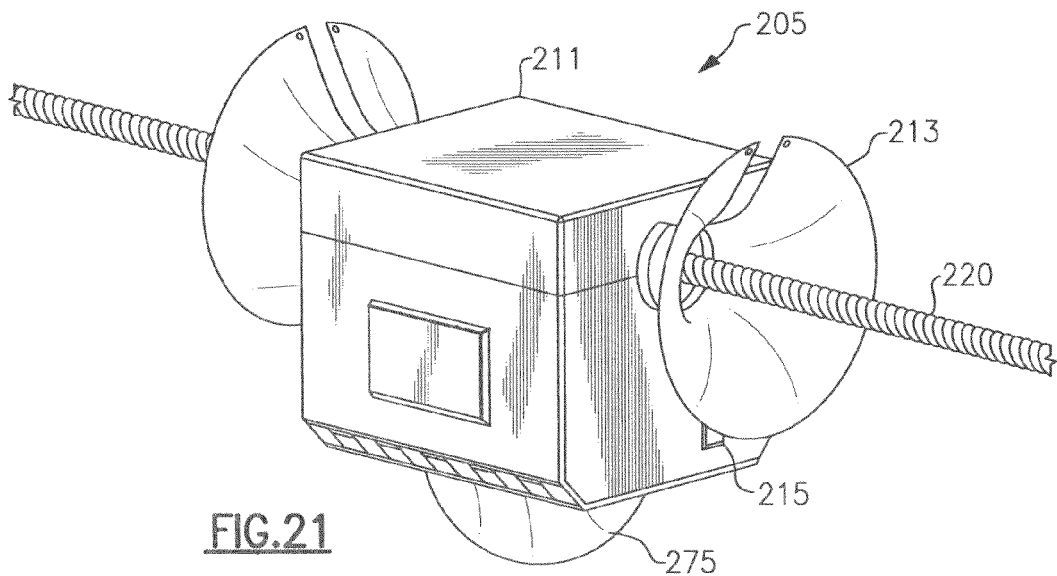
FIG. 21 is a drawing of an embodiment of a signal surface wave launcher with an ultra-sonic sensor in a bi-static radar system according to the present invention.

In other embodiments, the bi-static conductive line radar system further comprises a video sensor 270, which is co-located with at least one of the plurality of the bi-static conductive line radars, to confirm the bi-static conductive line radar system detection of the target 255 from the reflected signals 250, as shown in FIG. 20. In other embodiments, the bi-static conductive line radar system further comprises an ultra-sonic sensor 275, which is co-located with at least one of the plurality of the bi-static conductive line radars, to confirm the bi-static conductive line radar system detection of the target 255 from the reflected signals 250, as shown in FIG. 21.

In some embodiments, the method further comprises measuring at least one of wind movement and vibration of the power line 220 with an accelerometer, then calculating the effects of Doppler resulting from the at least one of wind movement and vibration of the power line 220 and removing the effects of Doppler in the signal processor 245 from the reflected signals 250 received from the target 255 at the signal surface wave transceiver.

In some embodiments, the method further comprises estimating the size of the target 255 in the signal processor 245 from the reflected signals 250 received from the target 255. In other embodiments, the method further comprises estimating the distance between the target 255 and the power line 220 in the signal processor 245 from the reflected signals 250 received from the target 255.

In other embodiments, the method further comprises estimating the speed of the target 255 in the signal processor 245 from the reflected signals 250 received from the target 255. The method can also comprise estimating more than one of the size of the target 255, the speed of the target 255 and the distance between the target 255 and the power line 220.

In some embodiments, the method further comprises receiving control signals from a command and control system at the signal surface wave launcher 205 using at least one RF communications link 215. In other embodiments, the method further comprises transmitting and receiving control signals between the surface wave launcher 205 and an adjacent signal surface wave launcher 206 using the at least one RF communications link 215, such as a communications transceiver with integrated antenna.

In some embodiments, the method further comprises confirming the detection of the target 255 from the reflected signals 250 using an acoustic sensor 260 that is co-located with at least one signal surface wave transceiver in the bi-static conductive line radar. In other embodiments, the method further comprises confirming the detection of the target 255 from the reflected signals 250 using an infrared (IR) sensor 265 that is co-located with at least one signal surface wave transceiver in the bi-static conductive line radar. In some embodiments, the method further comprises confirming the detection of the target 255 from the reflected signals 250 using a video sensor 270 that is co-located with at least one signal surface wave transceiver in the bi-static conductive line radar. In some embodiments, the method further comprises confirming the detection of the target 255 from the reflected signals 250 using an ultra-sonic sensor 275 that is co-located with at least one signal surface wave transceiver in the bi-static conductive line radar.

In some embodiments, the method of the present invention further comprises monitoring a status of the signal surface wave launcher 205 using the at least one RF communications link 215, such as an RF communications transceiver with integrated antenna. In other embodiments, the method further comprises setting up the signal surface wave launcher 205 for transmission using the RF communications link 215.

Figure 22:
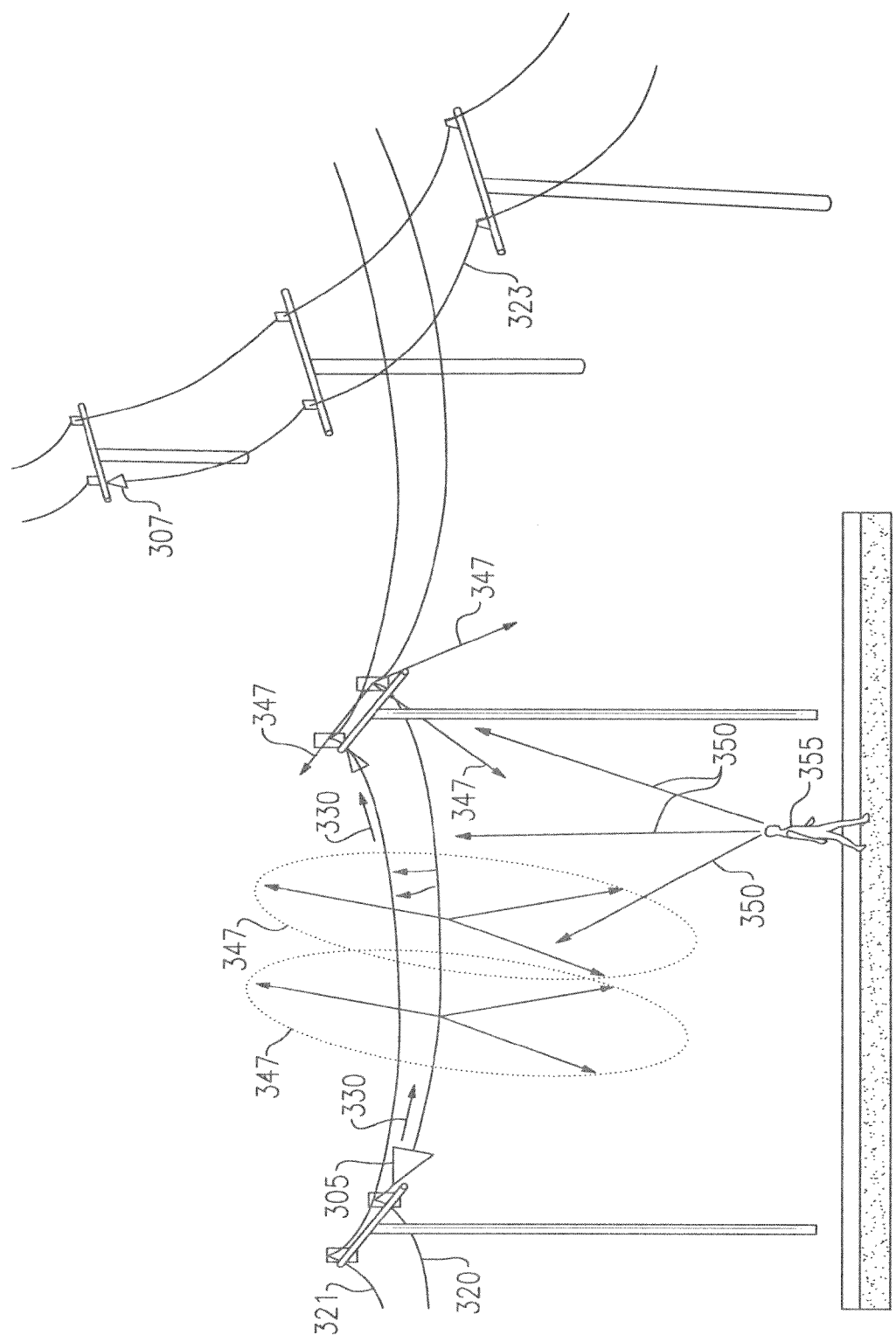
FIG. 22 depicts an embodiment of a wave signal traveling along and radiating from a power line after being launched by a signal surface wave launcher and receiving the reflected signal in a multi-static radar system according to the present invention.
Figure 33:
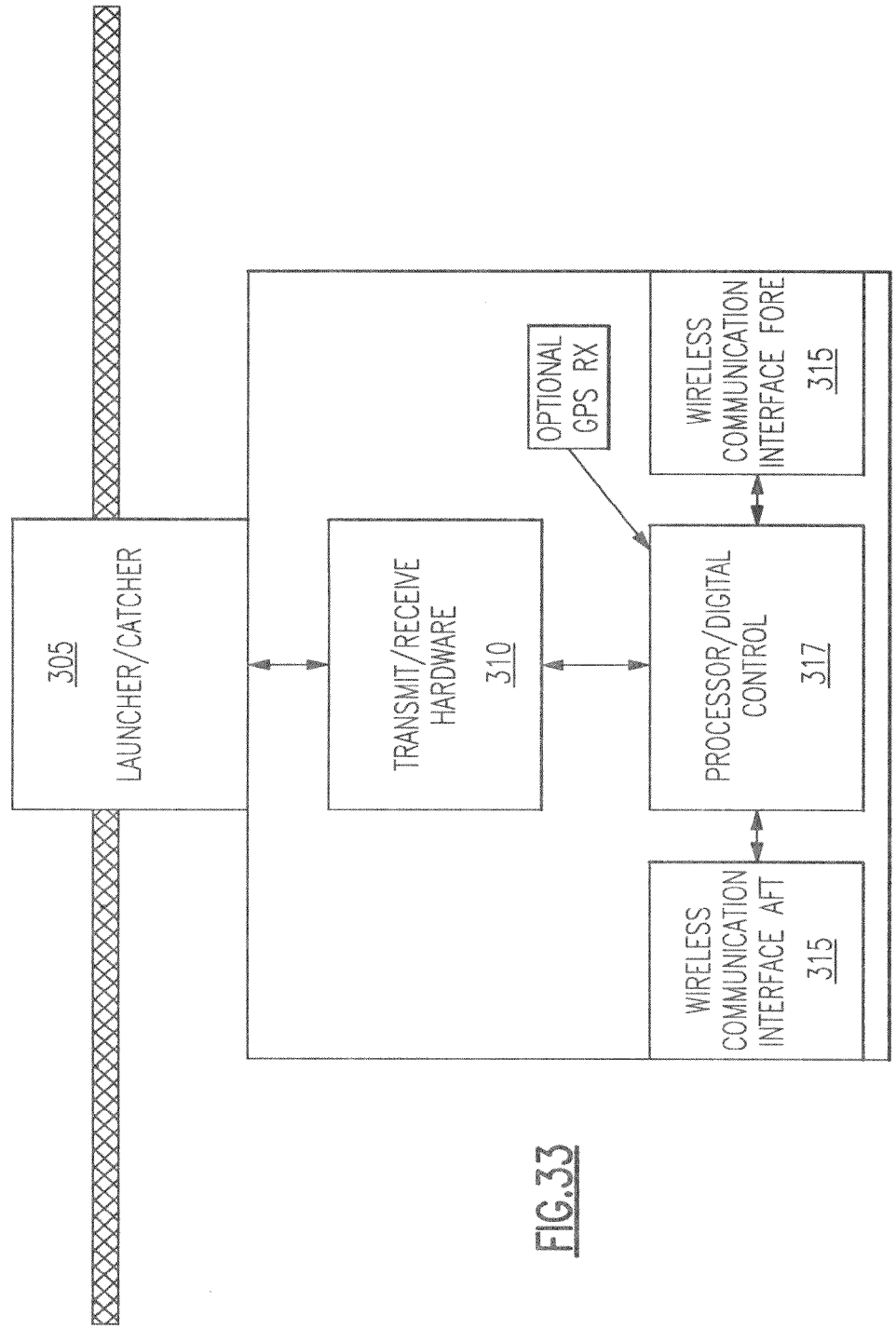
FIG. 33 depicts hardware subsystems contained within an embodiment of a signal surface wave launcher.

An embodiment of a multi-static conductive line radar system of the present invention comprises at least a first signal surface wave launcher 305 physically attached to a first power line 320, a second signal surface wave launcher 306 physically attached to a second power line 321, the second power line 321 being substantially parallel to the first power line 320, and a third signal surface wave launcher 307 physically attached to the second power line 321 or a third power line 322, as shown in FIG. 22. The second signal surface wave launcher 306 is separated from the first signal surface wave launcher 305 by a distance in a first direction and the third signal surface wave launcher 307 is separated from the first signal surface wave launcher 305 by a distance in a second direction, as shown in FIG. 22. The first signal surface wave launcher 305 comprises at least a first signal surface wave transceiver 310 facing in at least a first direction, at least a first RF communications link 315, and at least a first signal processor 317, as shown in FIG. 33. The second signal surface wave launcher 306 comprises at least a second signal surface wave transceiver 312, at least a second RF communications link 316, and at least a second signal processor 318, and the third signal surface wave launcher 307 comprises at least a third signal surface wave transceiver 314, at least a third RF communications link 323, and at least a third signal processor 319.

The first signal surface wave transceiver 310 transmits a wave signal 330 along the first power line 310 in at least the first direction and a radar signal 347 radiates from the wave signal 330 in a plurality of directions from the first power line 320 and at least one of the first signal surface wave transceiver 310, the second signal surface wave transceiver 312 and the third signal surface wave transceiver 314 receives reflected signals 350 from at least one target 355 from the radar signal 347 radiated in a plurality of directions from the first power line 320 within the distance from the first power line 320 along a length of the first power line 320, as shown in FIG. 22.

Figure 23:
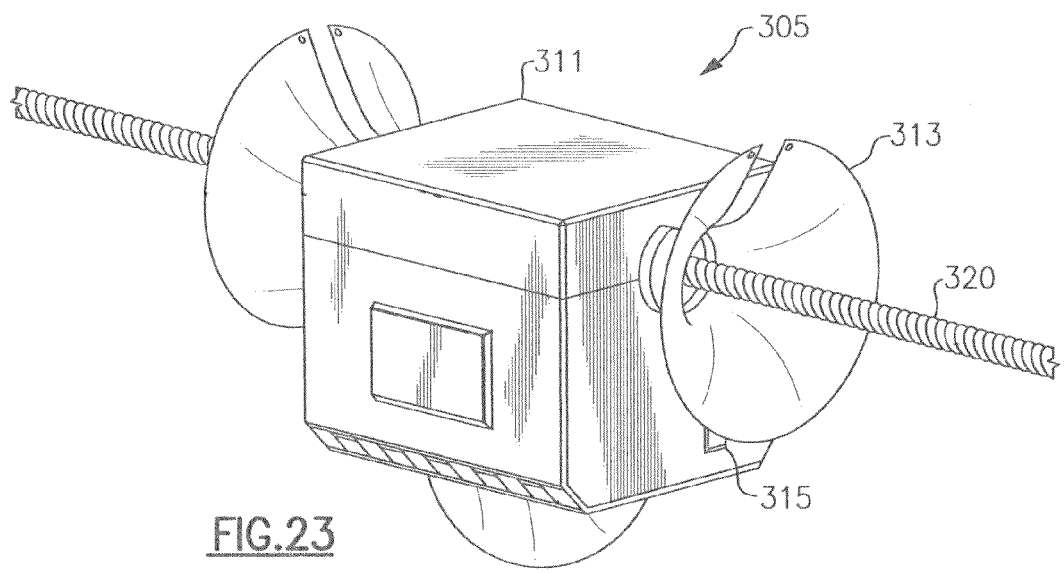
FIG. 23 is a drawing of an embodiment of a signal surface wave launcher in a multi-static radar system according to the present invention.

The signal surface wave transceiver 310 of the signal surface wave launcher 305 comprises a surface wave transceiver housing 311, at least one metallic housing and an input connector that are housed within the surface wave transceiver housing 311, and at least one flared horn 313, which surrounds the power line 320, as shown in FIG. 23. The at least one signal processor 317 and electronics for the at least one RF communication link 315 can be physically located within the interior of surface wave transceiver housing 311.

The surface wave transceiver housing 311 is attached to a portion of the power line 320 and is formed of a non-metallic material. The surface wave transceiver housing 311 covers and protects the metallic housing and coaxial input connector from the external environment. The surface wave transceiver housing 311 is typically formed in a rectangular shape, but can be formed in virtually any shape that will cover the metallic housing and coaxial input connector. In some embodiments, the surface wave transceiver housing 311 further comprises a hardwired input connector, an infrared input connector and/or a light signal connector for receiving data and/or command and control signals.

Figure 24A:
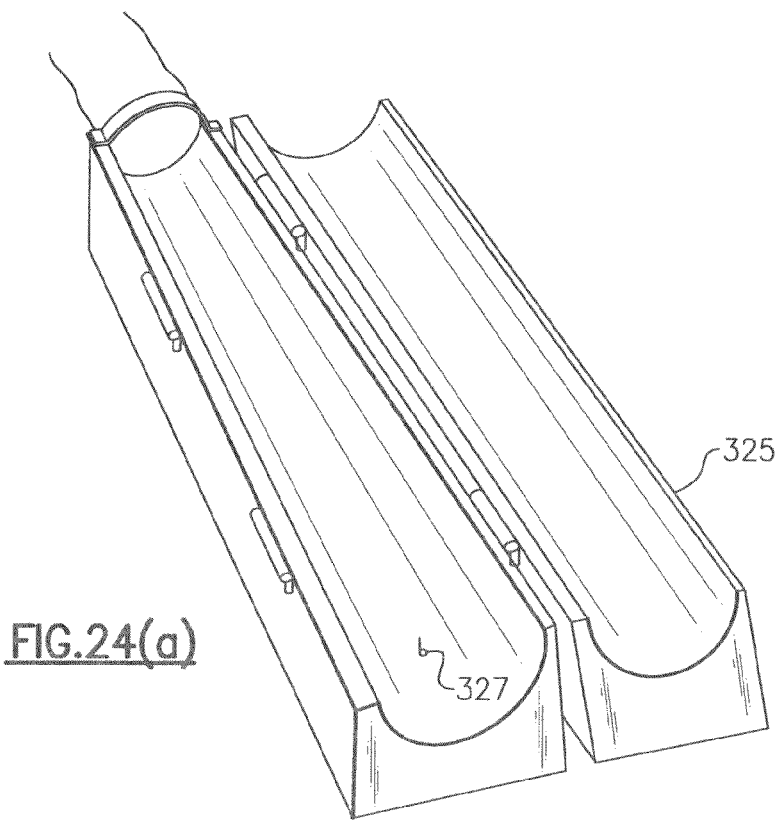
FIG. 24(a) is a drawing of an embodiment of a metallic housing of a signal surface wave launcher in a multi-static radar system according to the present invention.

The metallic housing 325 is formed to surround or enclose a portion of the power line 320. The metallic housing 325 can be formed in a tubular clamshell type configuration, as shown in FIG. 24(a). The metallic housing 325 can also have alternative shapes that can be secured within the surface wave transceiver housing 311 and enclose a portion of the power line 320 without damaging the power line 320.

Figure 24B:
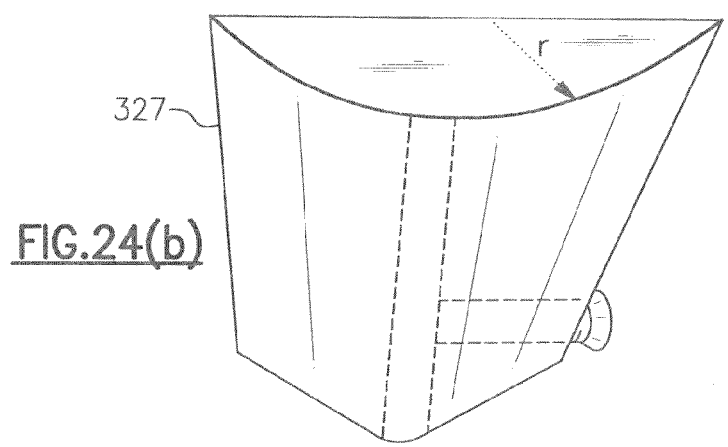
FIG. 24(b) is a drawing of an embodiment of a probe for connecting the coaxial connector of a signal surface wave launcher to the power line in a multi-static radar system according to the present invention.

The probe 327 can have a straight shape or a tapered shape, as shown in FIG. 24(*b*). The probe 327 physically interfaces and adapts the coaxial transmission cable to the power line to a coaxial transmission line mode to launch the wave signal on the power line 320 via flared horn 313.

The flared horn 313 is used to launch the wave signal 330, such as a transverse electromagnetic wave, along the power line 320. The flared horn 313 is formed in a way that can be installed over an existing power line 320, as shown in FIG. 23. The flared horn 313 also receives a wave signal 330 transmitted by another surface wave transceiver along the power line 320 and transfers the received wave signal to the one or more signal processors 317 contained within the surface wave transceiver housing 311. In some embodiments, one or more of the first signal surface wave transceivers 310 and the second signal surface wave transceivers 312 comprise a transceiver facing in a first direction and another transceiver facing in a second direction.

In some embodiments, one or more of the first signal surface wave transceiver 310, the second signal surface wave transceiver 312 and the third signal surface wave transceiver 314 comprises a transceiver facing in a first direction and another transceiver facing in a second direction.

The type of wave signals 330 that can be transmitted by the signal surface wave launcher 305 along the power line include a Sommerfeld wave.

The type of wave signals 330 that can be transmitted by the signal surface wave launcher 305 along the power line also include a continuous wave (CW) signal, a linear frequency modulated continuous wave (LFMCW) signal, an ultra-wideband (UWB) signal or a modulated signal using one of pulse position modulation (PPM), binary phase-shift keying (BPSK), differential phase-shift keying (DPSK), quadrature phase-shift keying (QPSK), multiple phase-shift keying (MPSK), continuous-phase frequency-shift keying (CPFSK), minimum shift keying (MSK), Gaussian minimum shift keying (GMSK), stepped CW and coded waveforms.

At least one of the signal processors 345 in the first, second and third signal surface wave launchers receives command and control signals via the RF communications link 315 and processes the command and control signals into a radar signal 347 that is transmitted with the wave signal 330. The flared horns 313 of at least one of the first, second and third signal surface wave launchers 305 pick up reflected signals 350 from the transmitted radar signal 347, as well as reflected signals from terrain, and pass the reflected signals 350 to at least one of the signal processors in the first, second and third signal surface wave launchers, which processes the reflected signals 350 to determine whether a target 355 is present within a detectable distance of the power line 320. The signal processors in the first, second and third signal surface wave launchers also receive the wave signal 330 carrying the radar signal 347 that were transmitted from one of the signal surface wave launchers and can re-transmit the received wave signal 330 and carried radar signal 347 to another signal surface wave launcher using the flared horn 313 on the opposite end of the surface wave transceiver housing 311 from the flared horn 313 receiving the wave signal 330 carrying the radar signal 347. When the signal processor in at least one of the first, second and third signal surface wave launchers detects a target 355 within a detectable distance of the power line 320, that signal processor transmits the target detection to the command and control system via the RF communications link 315.

The command and control system can transmit instructions and data to one or more of the signal surface wave launchers 305 via the RF communications link 315, a hardwired communications link, such as a coaxial cable, an infrared link or light link that include instructions to transmit a wave signal 330 along the first power line 320.

Figure 25:
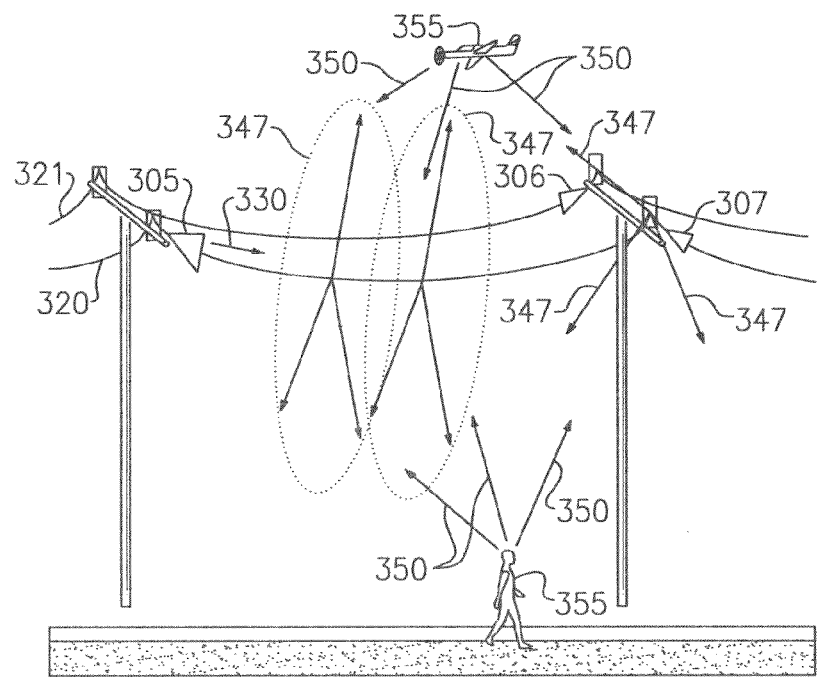
FIG. 25 depicts another embodiment of a wave signal traveling along and radiating from a power line after being launched by a signal surface wave launcher and receiving the reflected signal in a multi-static radar system according to the present invention.

Further, a method of detecting a target using a multi-static conductive line radar system is provided, the method comprises transmitting a wave signal 330 along a first power line 320 using a first signal surface wave launcher 305 mounted on the first power line 320, wherein the first signal surface wave transceiver 310 transmits about half of the wave signal 330 along the first power line 320 in the first direction and about half of the wave signal 330 along the first power line 320 in the second direction and a radar signal 347 radiates from the wave signal 330 in a plurality of directions from the first power line 320, receiving the wave signal 330 at least at one of a second signal surface wave launcher 306 and a third signal surface wave launcher 307, receiving reflected signals 350 from at least one target 355 from the signal radiated in the plurality of directions from at least the first power line 320 at least at one of the first signal surface wave transceiver 310, the second signal surface wave transceiver 312 and the third signal surface wave transceiver 314, and detecting the at least one target 355 within a distance from at least the first power line 320 from the reflected signals 350 received at least at one of the first signal surface wave transceiver 310, the second signal surface wave transceiver 312 and the third signal surface wave transceiver 314, as shown in FIG. 25. The first signal surface wave launcher 305 comprises a first signal surface wave transceiver 310 facing in at least a first direction and configured to transmit the wave signal in at least the first direction, at least a first RF communications link 315, and at least a first signal processor 317, the second signal surface wave launcher 306 comprises at least a second signal surface wave transceiver 312, at least a second RF communications link 316, and at least a second signal processor 318, the second signal surface wave launcher 306 being mounted on the first power line 320 or a second power line 321, and the third signal surface wave launcher 307 comprises at least a third signal surface wave transceiver 314, at least a third RF communications link 323, and at least a third signal processor 319, the third signal surface wave launcher 307 being mounted on the first power line 320, the second power line 321 or a third power line 322, as shown in FIG. 25.

In this embodiment of a multi-static conductive line radar, the wave signal 330 is launched by the first signal surface wave launcher 305, is coupled to the first power line 320 and radiates substantially perpendicular to the first power line 320 along the direction of travel of the wave signal 330 along the first power line 320. The wave signal also radiates in other directions due to sag in the first power line 320 or where discontinuities are present in the first power line 320, as shown in FIG. 22. The wave signal 330 acts as a carrier signal for a modulated signal, such as radar signal 347 that radiates from the wave signal 330.

The signal energy from the first signal surface wave launcher 305 couples into the wave signal, such as a Sommerfeld wave, and propagates down the first power line 320 at close to the speed of light, with only small losses from ohmic loss and radiation loss.

In the multi-static conductive line radar system, the power line 320 acts as the antenna with the direction of the transmitted wave signal 330 can be multi-directional due to discontinuities in the first power line 320, such as discontinuities caused by transformers and insulators along the length of the antenna (i.e.; power line 320). The radar signal 347 is radiated in free space and will impinge upon surfaces and objects including targets 355 within a detectable distance of about 250 meters on the ground along the length of power line 320 in which the wave signal 330 is transmitted.

The transmitted wave signal 330 and radar signal 347 are coupled from the first power line 320 to at least a substantially parallel second power line 321 that includes at least a second signal surface wave transceiver 312, and a third signal surface wave transceiver 314 that is mounted on the first power line 320, the second power line 321 or a third power line 322, receiving the transmitted wave signal 330. The first signal surface wave transceiver 310, the second signal surface wave transceiver 312 and the third signal surface wave transceiver 314 receive perpendicular return signals from the Sommerfeld wave portion of the transmitted signal and scattered return signals from one or more targets 355. The third signal surface wave transceiver 314 can also be physically attached to the first power line 320, the second power line 321 or a third power line 322 that is at an angle with respect to the first power line 320.

In some embodiments of the multi-static conductive line radar system, the power line can act as the antenna, and the direction of the transmitted wave can be multi-directional due to discontinuities of the antenna, wherein the reflected signals 350 from the at least one target 355 comprise at least a first signal having an positive doppler component and at least a second signal having a negative doppler component at least when the at least one target 355 is moving and physically located within the operational range of the transceiver and within the distance along the length of the power line 320. In some embodiments, the multi-static conductive line radar system detects the at least one target 355 on the ground or in low airspace at the distance that can be a function of type of transmitted waveform, transmitted power of the wave signal, diameter and physical configuration of the power line and at least one of radar cross section, speed, number of bright points and physical size of the at least one target 355.

The wave signal 330 transmitted by the signal surface wave launcher 305 propagates along the first power line 320 and radiates substantially perpendicular to the first power line 320 via a Sommerfeld wave. At least one of the first signal surface wave transceiver 310, the second signal surface wave transceiver 312 and the third signal surface wave transceiver 314 receives return signals from the Sommerfeld wave portion of the transmitted signal and scattered reflected signals 350 from one or more targets 355. At distances of up to 250 meters, $1/r^2$ is the dominant signal loss.

In the multi-static conductive line radar system, the terrain and objects within the detectable distance along the length of the power line 320 are determined by the multi-static conductive line radar system during installation. By determining the background objects and terrain within the detectable distance from the power line 320 and normalizing the data, thereby providing a good adaptive clutter map of the area in the vicinity of the power line 320, removing Doppler caused by at least one of wind movement and vibration of the power line and using Doppler processing to determine relative movement of objects within a detectable distance, the multi-static conductive line radar system can readily identify any new objects, especially moving objects, such as one or more targets 355 that is within the detectable distance. The background terrain and objects can be adapted to account for physical changes, such as tree and shrubbery growth over time. Changes in the baseline adaptive clutter map may also occur due to environmental changes, such as temperature, wind and humidity. In some embodiments, during the initial installation each of the transceivers will enter a brief learning phase to record and recognize the background objects and terrain.

A target 355 entering an area of surveillance, which is defined as an area within a specified distance from the power line 320 along the length of the power line 320, is detected from an increase in at least one of a change in signal Doppler and a change in signal amplitude from reflected signals 350 from the target 355 received by the signal surface wave transceiver 310. The distance at which the target 355 is detected can be a function of a type of transmitted waveform, transmitted power of the wave signal 330, diameter and physical configuration of the power line 320 and at least one of radar cross section of the target 355, speed of the target 355, number of bright points and physical size of the target 355. In some embodiments, the distance on the ground is within about 250 meters of the power line along the length of the power line and the distance in low airspace is within about 1000 meters of the power line along the length of the power line 320.

In the multi-static conductive line radar of the present invention, the reflected signals 350 from the one or more targets 355 comprises at least a first signal having an positive doppler component and at least a second signal having a negative doppler component when the target 355 is physically located within the operational range of the signal surface wave transceiver 310 within the detectable distance along the length of the power line 320 and is moving substantially parallel to the power line.

In the multi-static conductive line radar system of the present invention, an RF communications link 315 is established for transmitting an RF signal through free space that is not the signal used as the radar signal 347. The RF signal is received by an adjacent signal surface wave transceiver that is separated from the signal surface wave transceiver 310 by a distance that can be a function of at least one of the transmitted power of the RF signal, the frequency of the RF signal, the terrain and density of the vegetation in the area near the power line. In some embodiments, the distance at which the RF signal can be received by another signal surface wave transceiver is limited by line-of-sight (LOS). In other embodiments, the distance can be a function of a link budget for the command and control system.

In some embodiments of the multi-static conductive line radar system, at least one of the first signal surface wave launcher 305, the second signal surface wave launcher 306 and the third signal surface wave launcher 307 is inductively powered from the respective power line. In some embodiments, the distance between at least one of the second signal surface wave transceiver 312 and the first signal surface wave transceiver 310 and/or the third signal surface wave transceiver 314 and the second signal surface wave transceiver 312 can be a function of a type of transmitted waveform, transmitted power of the wave signal and diameter and physical configuration of the power line 320. In some embodiments, the distance is not more than about 800 meters.

In some embodiments of the multi-static conductive line radar system, the transceiver of the first signal surface wave transceiver 310 is paired with the receiver of the second signal surface wave transceiver 312 to form a first transmit/receive pair and the transceiver of the second signal surface wave transceiver 312 is paired with the receiver of the third signal surface wave transceiver 314 to form a second transmit/receive pair. In other embodiments, a plurality of the transmit/receive pairs are installed along at least the power line to form the multi-static conductive line radar system of a user selectable length. In these embodiments, at least the first transmit/receive pair and the second transmit/receive pair can receive a time slot based on a system-wide time reference to avoid interference within the multi-static conductive line radar system. In some embodiments of the multi-static conductive line radar system, the system-wide time reference is GPS 142, as shown in FIG. 32, or a system interface unit designated reference source that is adjusted in signal surface wave transceivers along the length of the one or more power lines forming the multi-static conductive line radar system. In some embodiments having a large number of signal surface wave launchers, more than one signal surface wave launcher will have the same slot time, but these signal surface wave launchers are separated in distance sufficiently to preclude interference.

In some embodiments, the multi-static conductive line radar system further comprises a first accelerometer to measure at least one of wind movement and vibration of the first power line 320, wherein at least the first signal processor removes effects of Doppler resulting from the at least one of wind movement and vibration of the first power line 320 measured by the first accelerometer from signals received at least at the first signal surface wave transceiver 310. In some of these embodiments, the first accelerometer is a MEMS accelerometer. In other embodiments, the multi-static conductive line radar system further comprises a second accelerometer to measure at least one of wind movement and vibration of the second power line 321, wherein at least one of the second signal processor and the third signal processor removes effects of Doppler resulting from the at least one of wind movement and vibration of the second power line 321 measured by the second accelerometer from signals received at least at the second signal surface wave transceiver 312 and the third surface wave transceiver 314 if the second signal surface wave launcher 306 and/or the third surface wave launcher 307 are connected to the second power line. In some of these embodiments, the second accelerometer is a MEMS accelerometer. In other embodiments, the multi-static conductive line radar system further comprises a third accelerometer to measure at least one of wind movement and vibration of a third power line 322 with a signal surface wave transceiver attached thereon having a signal processor removing the effects of Doppler resulting from the at least one of wind movement and vibration of the third power line 322.

In some embodiments of the multi-static conductive line radar system, the at least one target 355 entering an area of surveillance defined at least by the distance from the first power line 320 along the length of the first power line 320 is detected from an increase in at least one of signal Doppler and signal amplitude from reflected signals 350 from the at least one target 355 received by at least one of the first signal surface wave transceiver 310, the second signal surface wave transceiver 312 and the third signal surface wave transceiver 314.

In some embodiments of the multi-static conductive line radar system, at least one of the first signal processor 317, the second signal processor 318 and the third signal processor 319 estimates a size of the at least one target 355 from the reflected signals 350. In other embodiments, at least one of the first signal processor 317, the second signal processor 318 and the third signal processor 319 estimates a distance between the at least one target 355 and the power line where the reflected signals 355 were received. In some embodiments, at least one of the first signal processor 317, the second signal processor 318 and the third signal processor 319 estimates a speed of the at least one target 355 from the reflected signals 350.

In some embodiments, the first signal surface wave launcher 305 further comprises at least a first RF communications link 315, such as an RF transceiver with integrated antenna, the second signal surface wave launcher 305 further comprises at least a second RF communications link 316, such as an RF transceiver with integrated antenna, and the third signal surface wave launcher 307 further comprises at least a third RF communications link 323, such as an RF transceiver with integrated antenna, for transmitting control signals to circumvent at least one physical break in at least one of the first power line and the second power line. In some embodiments, at least one of the first RF communications link 315, the second RF communications link 316 and the third RF communications link 323 receives control signals from a command and control system and transmits target detections to the command and control system when the at least one target 355 is detected. In one embodiment, one or more of the signal surface wave launchers 305 transmit received reflected signals via RF communications link 315 to the command and control system and the command and control system detects target 355 within a detectable distance of the power line 320. In another embodiment, one or more of the signal surface wave launchers 305 transmit data from the received reflected signals via RF communications link 315 to the command and control system and the command and control system detects target 355 within a detectable distance of the power line 320.

Figure 26:
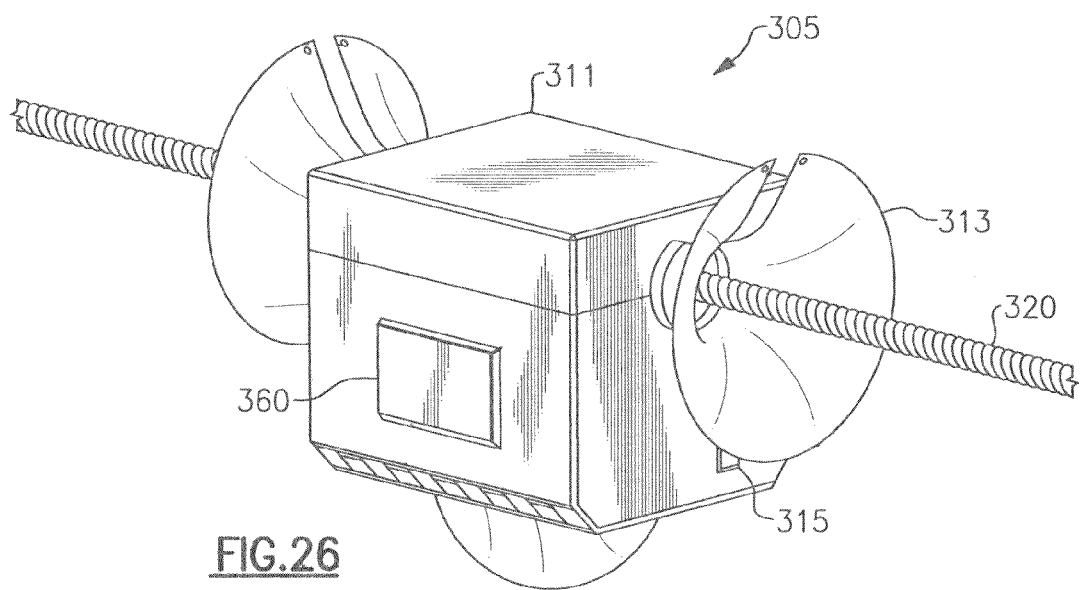
FIG. 26 is a drawing of an embodiment of a signal surface wave launcher with an acoustic sensor in a multi-static radar system according to the present invention.
Figure 27:
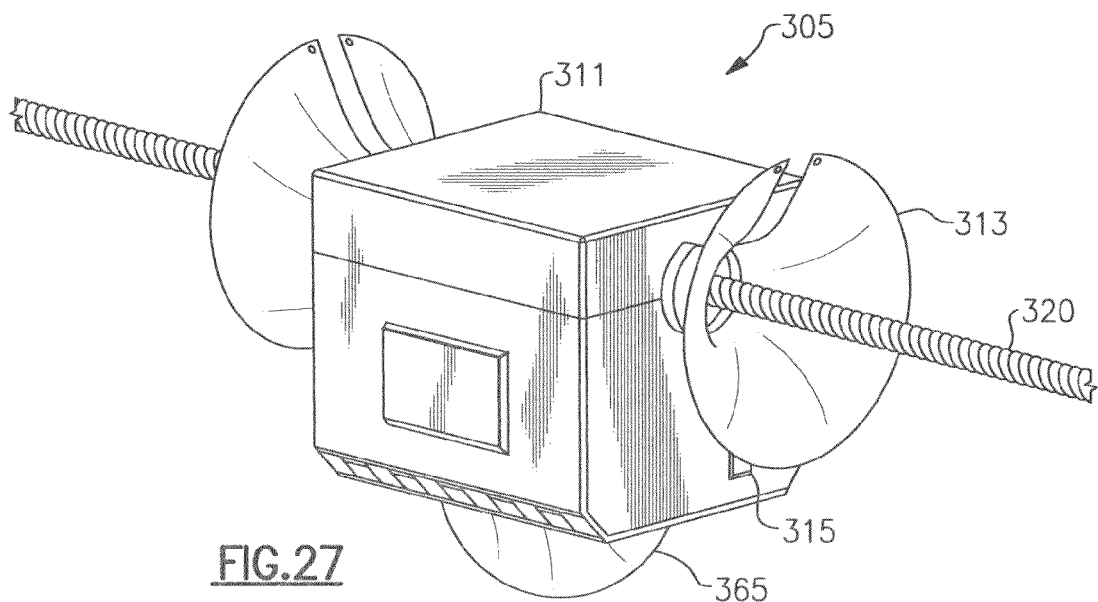
FIG. 27 is a drawing of an embodiment of a signal surface wave launcher with an infrared (IR) sensor in a multi-static radar system according to the present invention.

In some embodiments, the multi-static conductive line radar system further comprises an acoustic sensor 360 co-located with at least one of the first signal surface wave launcher 305, the second signal surface wave launcher 306 and the third signal surface wave launcher 307 to confirm the multi-static conductive line radar system detection of the at least one target 355 from the reflected signals 350, as shown in FIG. 26. In other embodiments, the multi-static conductive line radar system further comprises an infrared (IR) sensor 365 co-located with at least one of the first signal surface wave launcher 305, the second signal surface wave launcher 306 and the third signal surface wave launcher 307 to confirm the multi-static conductive line radar system detection of the at least one target 355 from the reflected signals 350, as shown in FIG. 27.

Figure 28:
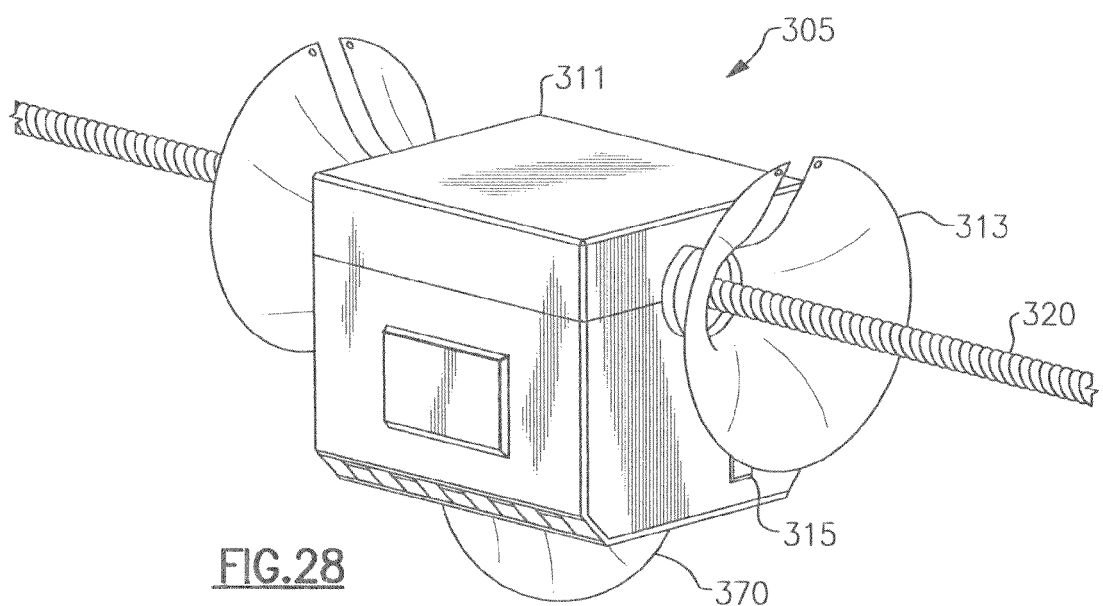
FIG. 28 is a drawing of an embodiment of a signal surface wave launcher with a video sensor in a multi-static radar system according to the present invention.
Figure 29:
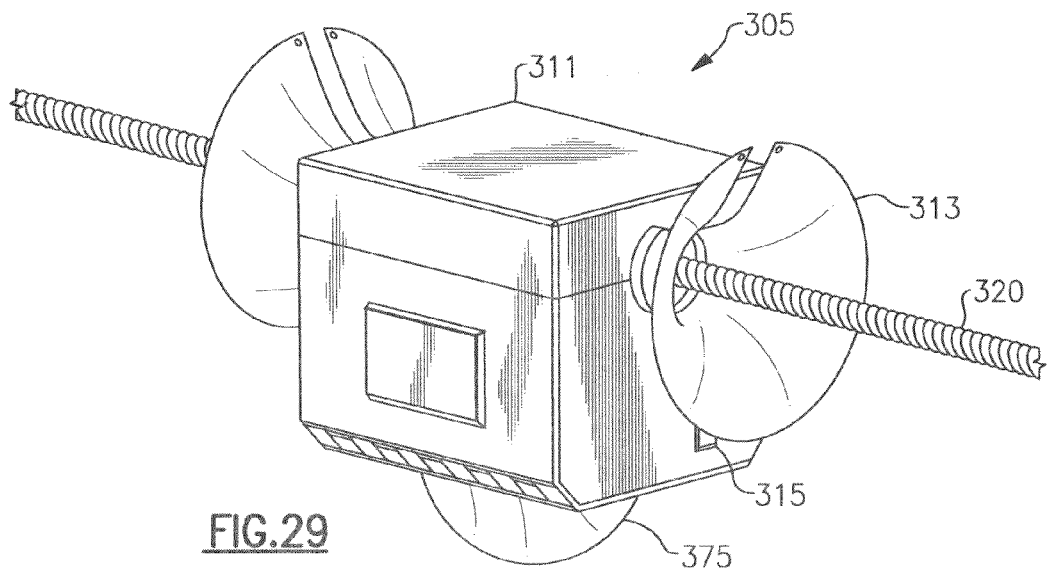
FIG. 29 is a drawing of an embodiment of a signal surface wave launcher with an ultra-sonic sensor in a multi-static radar system according to the present invention.

In some embodiments, the multi-static conductive line radar system further comprises a video sensor 370 co-located with at least one of the first signal surface wave launcher 305, the second signal surface wave launcher 306 and the third signal surface wave launcher 307 to confirm the multi-static conductive line radar system detection of the at least one target 355 from the reflected signals 350, as shown in FIG. 28. In some embodiments, the multi-static conductive line radar system further comprises an ultra-sonic sensor 375 co-located with at least one of the first signal surface wave launcher 305, the second signal surface wave launcher 306 and the third signal surface wave launcher 307 to confirm the multi-static conductive line radar system detection of the at least one target 355 from the reflected signals 350, as shown in FIG. 29.

In some embodiments, at least one of the second signal surface wave launcher 305 and the third signal surface wave launcher 306 further comprises a second signal surface wave transceiver 312 and a third signal surface wave transceiver 314, respectively, that retransmits the wave signal along a power line.

In some embodiments, the method further comprises measuring at least one of wind movement and vibration of the first power line 320 with an accelerometer, calculating effects of Doppler resulting from the at least one of wind movement and vibration of the first power line and removing the effects of Doppler from the reflected signals 350 received from the at least one target 355. In other embodiments, the method further comprises measuring at least one of wind movement and vibration of the second power line 321 with an accelerometer, calculating effects of Doppler resulting from the at least one of wind movement and vibration of the second power line 321 and removing the effects of Doppler from the reflected signals 350 received from the at least one target 355.

In some embodiments, the method further comprises estimating a size of the at least one target 355 from the reflected signals. In other embodiments, the method further comprises estimating a distance between the at least one target 355 and the power line from the reflected signals. In some embodiments, the method further comprises estimating a speed of the at least one target 355 from the reflected signals.

In some embodiments, the method further comprises receiving control signals from a command and control system at least at one of the first signal surface wave launcher 305, the second signal surface wave launcher 306 and the third signal surface wave launcher 307 using at least one of the first RF communications link 315, the second RF communications link 316 and the third RF communications link 323. In other embodiments, the method further comprises transmitting the detection of the at least one target 355 to a command and control system from the reflected signals 350 received at least at one of the first signal surface wave launcher 305, the second signal surface wave launcher 306 and the third signal surface wave launcher 307.

In some embodiments, the method further comprises transmitting and receiving control signals between at least the first signal wave launcher 305 and the second signal surface wave launcher 305 using at least the first RF communications link 315 and the second RF communications link 316. In other embodiments, the method further comprises transmitting and receiving control signals between at least the first signal wave launcher 305 and the third signal surface wave launcher 307 using at least the first RF communications link 315 and the third RF communications link 323.

In some embodiments, the method further comprises confirming the detection of the at least one target 355 from the reflected signals 350 using an acoustic sensor 360 co-located with at least one of the first signal surface wave launcher 305, the second signal surface wave launcher 306 and the third signal surface wave launcher 307. In other embodiments, the method further comprises confirming the detection of the at least one target 355 from the reflected signals 350 using an infrared (IR) sensor 365 co-located with at least one of the first signal surface wave launcher 305, the second signal surface wave launcher 306 and the third signal surface wave launcher 307. In some embodiments, the method further comprises confirming the detection of the at least one target 355 from the reflected signals 350 using a video sensor 370 co-located with at least one of the first signal surface wave launcher 305, the second signal surface wave launcher 306 and the third signal surface wave launcher 307. In some embodiments, the method further comprises confirming the detection of the at least one target 355 from the reflected signals 350 using an ultra-sonic sensor 375 co-located with at least one of the first signal surface wave launcher 305, the second signal surface wave launcher 306 and the third signal surface wave launcher 307.

In some embodiments, the method further comprises monitoring a status of at least one of the first signal surface wave launcher 305, the second signal surface wave launcher 306 and the third signal surface wave launcher 307 using at least one of the first RF communications link 315, the second RF communications link 316 and the third RF communications link 323. In other embodiments, the method further comprises setting up at least one of the first signal surface wave launcher 305, the second signal surface wave launcher 306 and the third signal surface wave launcher 307 for transmission using at least one of the first RF communications link 315, the second RF communications link 316 and the third RF communications link 323.

In some embodiments, the method further comprises pairing the first signal surface wave transceiver 310 with the second signal surface wave transceiver 312 to form a first transmit/receive pair and pairing the second signal surface wave transceiver 312 with the third signal surface wave transceiver 314 to form a second transmit/receive pair. In some of these embodiments, the method further comprises receiving the wave signal 330 at the second transmit/receive pair adjacent to the first transmit/receive pair and sequentially transmitting the wave signal 330 from the second transmit/receive pair to an adjacent transmit/receive pair of the plurality of the transmit/receive pairs as a means to extend the area of coverage over the length covered by a system comprising a plurality of transmit/receive pairs.

In other embodiments, the method further comprises forming the multi-static conductive line radar of a user selectable length using a plurality of the transmit/receive pairs along at least the first power line 320 and the second power line 321. In some of these embodiments, the method further comprises receiving a time slot at each of the plurality of the transmit/receive pairs based on a system-wide time reference, such as GPS 142, as shown in FIG. 32, or a system interface unit designated reference source, to avoid interference within the multi-static conductive line radar.

Example

Figure 30:
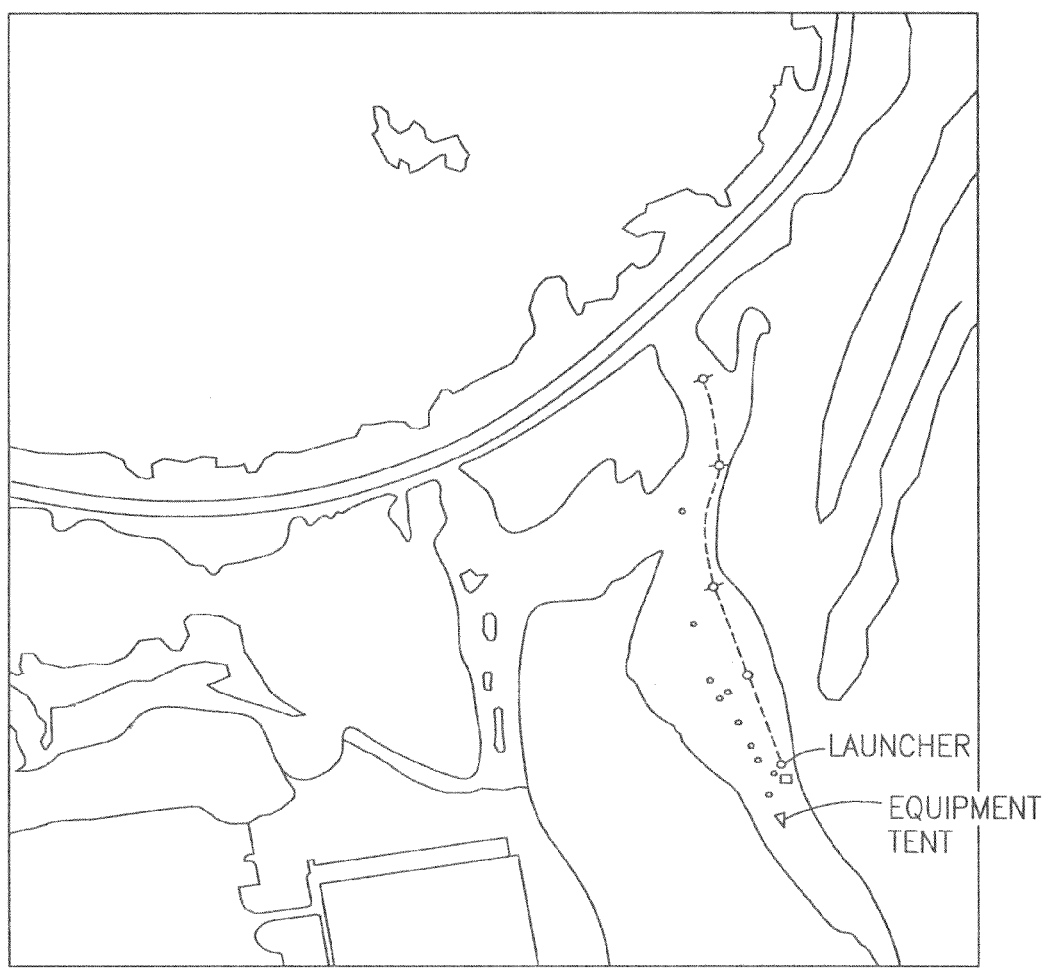
FIG. 30 is one example of a test set up for a bi-static conductive line radar according to the present invention.

A bi-static conductive line radar was tested using a set of parallel 2 conductor ACSR-2 (Sparrow) unpowered lines that are 450 feet in length and are at an angle to an access road as shown in FIG. 30. A first surface signal wave launcher 205 was attached at one end of the first unpowered line and a second surface signal wave launcher 206 was connected at the opposite end of the second unpowered line 220.

Figure 31:
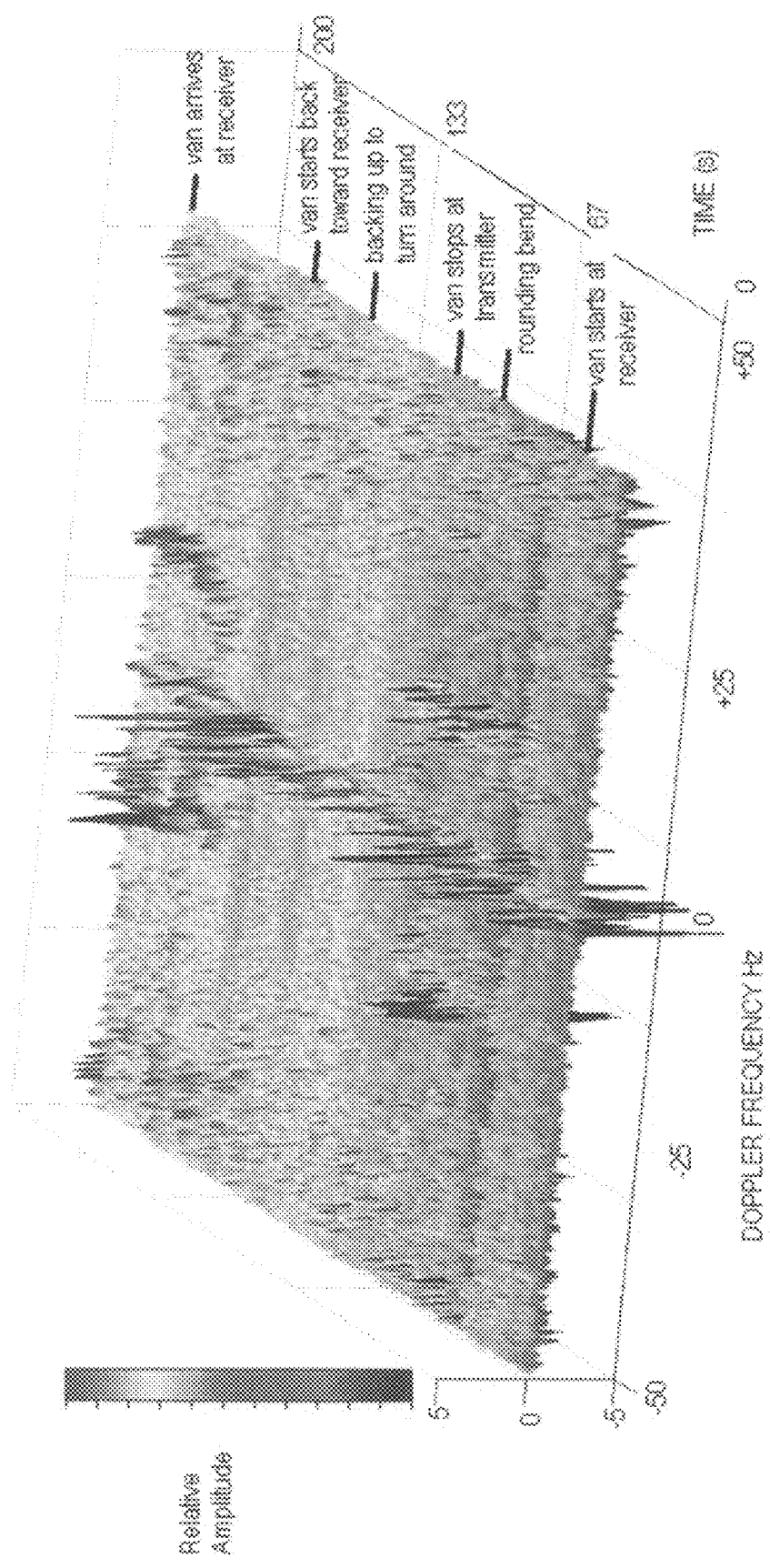
FIG. 31 is data from one test set up for a bi-static conductive line radar according to the present invention.

For the initial testing, a low-phase noise RF generator was connected to the first surface signal wave launcher 205 and a real-time spectrum analyzer was connected to the second surface signal wave launcher 206 which acted as a receiver. Multiple targets were monitored while transiting the access road near the bi-static conductive line radar. As shown in FIG. 31, persons walking and jogging and vehicles transiting along the access road were detected by the bi-static conductive line radar.

It will be understood that various modifications and changes may be made in the present invention by those of ordinary skill in the art who have the benefit of this disclosure. All such changes and modifications fall within the spirit of this invention, the scope of which is measured by the following appended claims.

What is claimed is:

1. A mono-static conductive line radar system comprising:
a mono-static conductive line radar comprising a signal surface wave launcher physically attached to a power line, said signal surface wave launcher comprising:
a signal surface wave transceiver;
at least one RF communications transceiver with integrated antenna; and
at least one signal processor;
said signal surface wave transceiver transmitting a wave signal along said power line, wherein a signal radiates from said wave signal in a plurality of directions from said power line;
said signal surface wave transceiver receives reflected signals from at least one target from said signal radiated in a plurality of directions from said power line within a distance from said power line along a length of said power line;

said at least one signal processor detects said at least one target from said reflected signals received from at least said signal surface wave transceiver;

wherein said at least one RF communications transceiver with integrated antenna receives control signals from a control station and transmits target detections to said control station when said at least one target is detected, and wherein said at least one RF communications transceiver with integrated antenna transmits said control signals to an adjacent signal surface wave launcher to bypass a failed RF communications transceiver.

2. The mono-static conductive line radar system of claim 1, wherein said signal surface wave launcher is inductively powered from said power line.

3. The mono-static conductive line radar system of claim 1, wherein a communication link is established for transmitting a signal through free space, that is not the signal used for the radar function and said signal is received by an adjacent signal surface wave transceiver that is separated from said signal surface wave transceiver by said distance that is a function of at least one of a type of transmitted waveform, transmitted power of said wave signal and diameter and physical configuration of said power line.

4. The mono-static conductive line radar system of claim 3, wherein said distance is not more than about 800 meters.

5. The mono-static conductive line radar system of claim 3, wherein said distance is a function of a link budget for a command and control system.

6. The mono-static conductive line radar system of claim 1, wherein said at least one target entering an area of surveillance defined at least by said distance from said power line along said length of said power line is detected from an increase in signal amplitude from reflected signals from said at least one target received by said signal surface wave transceiver.

7. The mono-static conductive line radar system of claim 6, wherein the power line as the antenna, and a direction of the transmitted wave is multi-directional due to discontinuities of said antenna, wherein said reflected signals from said at least one target comprise at least a first signal having an positive doppler component and at least a second signal having a negative doppler component at least when said at least one target is physically located within the operational range of the transceiver and within said distance along said length of said power line.

8. The mono-static conductive line radar system of claim 6, wherein said distance at which said at least one target is detected is a function of a type of transmitted waveform, transmitted power of said wave signal, diameter and physical configuration of said power line and at least one of radar cross section of said at least one target, speed of said at least one target, number of bright points and physical size of said at least one target.

9. The mono-static conductive line radar system of claim 8, wherein said distance on the ground is within about 250 meters of said power line along said length of said power line.

10. The mono-static conductive line radar system of claim 8, wherein said distance in low airspace within about 1000 meters of said power line along said length of said power line.

11. The mono-static conductive line radar system of claim 8, further comprising an acoustic sensor co-located with at least one of said plurality of said mono-static conductive line radars to confirm said mono-static conductive line radar system detection of said at least one target from said reflected signals.

12. The mono-static conductive line radar system of claim 1, further comprising an accelerometer measuring at least one of a wind movement and a vibration of said power line, wherein said at least one signal processor removes effects of Doppler resulting from the at least one of said wind movement and said vibration of said power line measured by said accelerometer from signals received at said signal surface wave transceiver.

13. The mono-static conductive line radar system of claim 12, wherein the accelerometer is a MEMS accelerometer.

14. The mono-static conductive line radar system of claim 1, wherein said wave signal transmitted along said power line by said signal surface wave transceiver comprises a Sommerfeld wave.

15. The mono-static conductive line radar system of claim 1, wherein said wave signal is an ultra-wideband (UWB) signal.

16. The mono-static conductive line radar system of claim 1, wherein said wave signal is a continuous wave (CW) signal.

17. The mono-static conductive line radar system of claim 1, wherein said wave signal is a linear frequency modulated continuous wave (LFMCW) signal.

18. The mono-static conductive line radar system of claim 1, wherein said wave signal is a modulated signal using one of pulse position modulation (PPM), binary phase-shift keying (BPSK), differential phase-shift keying (DPSK), quadrature phase-shift keying (QPSK), multiple phase-shift keying (MPSK), continuous-phase frequency-shift keying (CPFSK), minimum shift keying (MSK), Gaussian minimum shift keying (GMSK), stepped CW and coded waveforms.

19. The mono-static conductive line radar system of claim 1, wherein said at least one signal processor estimates a size of said at least one target from said reflected signals received from said at least one target at said signal surface wave transceiver.

20. The mono-static conductive line radar system of claim 1, wherein said at least one signal processor estimates a distance between said at least one target and said power line from said reflected signals received from said at least one target at said signal surface wave transceiver.

21. The mono-static conductive line radar system of claim 1, wherein said at least one signal processor estimates a speed of said at least one target from said reflected signals received from said at least one target at said signal surface wave transceiver.

22. The mono-static conductive line radar system of claim 1, wherein said at least one RF communications transceiver with integrated antenna transmits said control signals to an adjacent signal surface wave launcher to circumvent at least one physical break in said power line.

23. The mono-static conductive line radar system of claim 1, wherein said at least one RF communications transceiver with integrated antenna transmits said control signals to said adjacent signal surface wave launcher physically attached to a second power line that is not in direct physical contact with said power line.

24. The mono-static conductive line radar system of claim 1, further comprising an infrared (IR) sensor co-located with at least one of said plurality of said mono-static conductive line radars to confirm said mono-static conductive line radar system detection of said at least one target from said reflected signals.

25. The mono-static conductive line radar system of claim 1, further comprising a video sensor co-located with at least one of said plurality of said mono-static conductive line radars to confirm said mono-static conductive line radar system detection of said at least one target from said reflected signals.

26. The mono-static conductive line radar system of claim 1, further comprising an ultra-sonic sensor co-located with at least one of said plurality of said mono-static conductive line radars to confirm mono-static conductive line radar system detection of said at least one target from said reflected signals.

27. The mono-static conductive line radar system of claim 1, wherein a plurality of said mono-static conductive line radars are installed along at least said power line to form said mono-static conductive line radar system of a user selectable length.

28. A method of detecting a target using a mono-static conductive line radar, said method comprising:
transmitting a wave signal along a power line from said mono-static conductive line radar mounted on said power line, said mono-static conductive line radar comprising:
a signal surface wave transceiver physically attached to said power line;
at least one RF communications transceiver with integrated antenna; and
at least one signal processor, wherein a signal radiates from said wave signal in a plurality of directions from said power line;
receiving reflected signals from at least one target within a distance from said power line along a length of said power line at said signal surface wave transceiver from said signal radiated in said plurality of directions from said power line;
detecting said at least one target from said reflected signals received at said signal surface wave transceiver when said at least one target is within said distance from said power line; and
transmitting and receiving control signals between said monostatic conductive line radar and an adjacent mono-static conductive line radar using said at least one communications transceiver with integrated antenna.

29. The method of claim 27, wherein a plurality of mono-static conductive line radars are mounted on at least one of adjacent power lines and crossing power lines, said method further comprising operating each of said plurality of mono-static conductive line radars within a predetermined time slot based on a system-wide time reference to avoid interference within said mono-static conductive line radar system.

30. The method of claim 28, further comprising measuring at least one of a wind movement and a vibration of said power line with an accelerometer, calculating effects of Doppler resulting from the at least one of said wind movement and said vibration of said power line and removing said effects of Doppler in said at least one signal processor from said reflected signals received from said at least one target at said signal surface wave transceiver.

31. The method of claim 28, further comprising estimating a size of said at least one target in said at least one signal processor from said reflected signals received from said at least one target.

32. The method of claim 28, further comprising estimating a distance between said at least one target and said power line in said at least one signal processor from said reflected signals received from said at least one target.

33. The method of claim 28, further comprising estimating a speed of said at least one target in said at least one signal processor from said reflected signals received from said at least one target.

34. The method of claim 28, further comprising receiving control signals from a control station at said monostatic conductive line radar using the at least one RF communications transceiver with integrated antenna.

35. The method of claim 28, further comprising confirming said detection of said at least one target from said reflected signals using an acoustic sensor co-located with said mono-static conductive line radar.

36. The method of claim 28, further comprising confirming said detection of said at least one target from said reflected signals using an infrared (IR) sensor co-located with said mono-static conductive line radar.

37. The method of claim 28, further comprising confirming said detection of said at least one target from said reflected signals using a video sensor co-located with at least one of said plurality of said mono-static conductive line.

38. The method of claim 28, further comprising confirming said detection of said at least one target from said reflected signals using an ultra-sonic sensor co-located with at least one of said plurality of said mono-static conductive line radars.

39. The method of claim 28, further comprising monitoring a status of said monostatic conductive line radar using said at least one RF communications transceiver with integrated antenna.

40. The method of claim 28, further comprising setting up said monostatic conductive line radar for transmission using said at least one RF communications transceiver with integrated antenna.

41. A bi-static conductive line radar system comprising:
at least one bi-static conductive line radar comprising:
a first signal surface wave launcher physically attached to a first power line, said first signal surface wave launcher comprising:
a first signal surface wave transmitter and a first signal surface wave receiver;
at least a first RF communications transceiver with integrated antenna; and
at least a first signal processor;
said first signal surface wave transmitter transmitting a wave signal along said first power line, wherein a signal radiates from said wave signal in a plurality of directions from said first power line,
a second signal surface wave launcher physically attached to a second power line, said second power line being substantially parallel to said first power line; said second signal surface wave launcher comprising:
a second signal surface wave transmitter and a second signal surface wave receiver;
at least a second RF communications transceiver with integrated antenna; and
at least a second signal processor;
said second signal surface wave launcher being separated from said first signal surface wave transmitter by a distance;
at least one of said first signal surface wave receiver and said second signal surface wave receiver receives reflected signals from at least one target from said signal radiated in a plurality of directions from said first power line within a distance from said first power line along a length of said first power line; and
at least one of said first signal processor and said second signal processor detects said at least one target from said reflected signals received by at least one of said first signal surface wave receiver and said second signal surface wave receiver.

42. The bi-static conductive line radar system of claim 41, further comprising a first accelerometer measuring at least one of a wind movement and a vibration of said first power line, wherein at least said first signal processor removes effects of Doppler resulting from the at least one of said wind movement and said vibration of said first power line measured by said first accelerometer from signals received at least at said first signal surface wave receiver.

43. The bi-static conductive line radar system of claim 41, further comprising an acoustic sensor co-located with at least one of said first signal surface wave launcher and said second signal surface wave launcher to confirm said bi-static conductive line radar system detection of said at least one target from said reflected signals.

44. The bi-static conductive line radar system of claim 41, further comprising an infrared (IR) sensor co-located with at least one of said first signal surface wave launcher and said second signal surface wave launcher to confirm said bi-static conductive line radar system detection of said at least one target from said reflected signals.

45. The bi-static conductive line radar system of claim 41, further comprising a video sensor co-located with at least one of said first signal surface wave launcher and said second signal surface wave launcher to confirm said bi-static conductive line radar system detection of said at least one target from said reflected signals.

46. The bi-static conductive line radar system of claim 41, further comprising an ultra-sonic sensor co-located with at least one of said first signal surface wave launcher and said second signal surface wave launcher to confirm said bi-static conductive line radar system detection of said at least one target from said reflected signals.

47. A method of detecting a target using a bi-static conductive line radar, said method comprising:
  transmitting a wave signal along a first power line using a first signal surface wave launcher, said first signal surface wave launcher being mounted on said first power line, said first signal surface wave launcher comprising:
    a first signal surface wave transmitter and a first signal surface wave receiver;
    at least a first RF communications transceiver with integrated antenna; and
    at least a first signal processor, wherein a signal radiates from said wave signal in a plurality of directions from said first power line along a length of said first power line;
  receiving reflected signals from at least one target within a distance from said first power line at least at one of said first signal surface wave launcher and a second signal surface wave launcher from said signal radiated in said plurality of directions from said first power line, said second signal surface wave launcher being mounted on a second power line and separated from said first signal surface wave transmitter, said second signal surface wave launcher comprising:
    a second signal surface wave transmitter and a second signal surface wave receiver;
    at least a second RF communications transceiver with integrated antenna;
    at least a second signal processor; and
  detecting said at least one target from said reflected signals received by at least one of said first signal surface wave receiver and said second signal surface wave receiver.

48. A multi-static conductive line radar system comprising:
  at least a first signal surface wave launcher physically attached to a first power line, said first signal surface wave launcher comprising:
    at least a first signal surface wave transmitter facing in a first direction and a second signal surface wave transmitter facing in a second direction;
    at least a first signal surface wave receiver;
    at least a first RF communications transceiver with integrated antenna; and
    at least a first signal processor;
  said first signal surface wave transmitter transmitting a wave signal along said first power line in said first direction and said second signal surface wave transmitter transmitting said wave signal along said first power line in said second direction, wherein a signal radiates from said wave signal in a plurality of directions from said first power line,
  a second signal surface wave launcher physically attached to a second power line, said second power line being substantially parallel to said first power line; said second signal surface wave launcher comprising:
    at least a second signal surface wave receiver;
    at least a second RF communications transceiver with integrated antenna; and
    at least a second signal processor;
  said second signal surface wave launcher being separated from said first signal surface wave transmitter by a distance;
  a third signal surface wave launcher physically attached to said second power line, said second power line being substantially parallel to said first power line; said third signal surface wave launcher comprising:
    at least a third signal surface wave receiver;
    at least a third RF communications transceiver with integrated antenna; and
    at least a third signal processor;
  said second signal surface wave launcher being separated from said first signal surface wave transmitter by a distance in said first direction and said third signal surface wave launcher being separated from said first signal surface wave transmitter by a distance in said second direction; and
  at least one of said first signal surface wave receiver, said second signal surface wave receiver and said third signal surface wave receiver receives reflected signals from at least one target from said signal radiated in a plurality of directions from said first power line within said distance from said first power line along a length of said first power line.

49. A method of detecting a target, using a multi-static conductive line radar, said method comprising:
  transmitting a wave signal along a first power line using a first signal surface wave launcher mounted on said first power line, said first signal surface wave launcher comprising:
    a first signal surface wave transmitter facing in at least a first direction and configured to transmit said wave signal in said first direction and a second direction;
    at least a first signal surface wave receiver;
    at least a first RF communications transceiver with integrated antenna; and
    at least a first signal processor, wherein said first signal surface wave transmitter transmits about half of the said wave signal along said first power line in said first direction and about half of the said wave signal along said first power line in said second direction and a signal radiates from said wave signal in a plurality of directions from said first power line;

receiving said wave signal at least at one of a second signal surface wave launcher and a third signal surface wave launcher, said second signal surface wave launcher being mounted on said first power line or a second power line, said second signal surface wave launcher comprising:

at least a second signal surface wave receiver;
at least a second RF communications transceiver with integrated antenna; and
at least a second signal processor;

said third signal surface wave launcher being mounted on said first power line or said second power line, said third signal surface wave launcher comprising:

at least a third signal surface wave receiver;
at least a third RF communications transceiver with integrated antenna; and
at least a third signal processor;
receiving reflected signals from at least one target from said signal radiated in said plurality of directions from at least said first power line at least at one of said first signal surface wave receiver, said second signal surface wave receiver and said third signal surface wave receiver; and detecting said at least one target within a distance from at least said first power line from said reflected signals received at least at one of said first signal surface wave receiver, said second signal surface wave receiver and said third signal surface wave receiver.

\* \* \* \* \*

UNITED STATES PATENT AND TRADEMARK OFFICE
CERTIFICATE OF CORRECTION

PATENT NO. : 8,159,385 B2
APPLICATION NO. : 12/658217
DATED : April 17, 2012
INVENTOR(S) : Mike Farneth et al.

It is certified that error appears in the above-identified patent and that said Letters Patent is hereby corrected as shown below:

Column 43

*Line 44, Claim 29:* please change "claim 27" to --claim 28--

Signed and Sealed this
Twenty-sixth Day of June, 2012

David J. Kappos
*Director of the United States Patent and Trademark Office*